United States Patent
Shishime

(10) Patent No.: US 9,194,313 B2
(45) Date of Patent: Nov. 24, 2015

(54) SPARK-IGNITION ENGINE AND METHOD OF CONTROLLING THE SPARK-IGNITION ENGINE

(75) Inventor: Kouji Shishime, Hiroshima (JP)

(73) Assignee: Mazda Motor Corporation, Aki-gun (JP)

(*) Notice: Subject to any disclaimer, the term of this patent is extended or adjusted under 35 U.S.C. 154(b) by 906 days.

(21) Appl. No.: 13/437,785

(22) Filed: Apr. 2, 2012

(65) Prior Publication Data

US 2012/0271533 A1 Oct. 25, 2012

(30) Foreign Application Priority Data

Apr. 19, 2011 (JP) .................................. 2011-093399

(51) Int. Cl.
| | |
|---|---|
| F02D 41/04 | (2006.01) |
| F02D 41/00 | (2006.01) |
| F02D 35/02 | (2006.01) |
| F02D 13/02 | (2006.01) |
| F02D 15/00 | (2006.01) |

(52) U.S. Cl.
CPC .......... *F02D 41/0025* (2013.01); *F02D 35/021* (2013.01); *F02D 35/027* (2013.01); *F02D 41/0002* (2013.01); *F02D 13/0276* (2013.01); *F02D 15/00* (2013.01); *F02D 2041/001* (2013.01); *F02D 2200/021* (2013.01); *F02D 2200/0414* (2013.01); *F02D 2200/0612* (2013.01); *Y02T 10/42* (2013.01)

(58) Field of Classification Search
CPC ................ F02D 13/0276; F02D 15/00; F02D 2200/021; F02D 41/0025; F02D 2200/0612; F02D 2041/001; F02D 41/0002; F02D 35/027; F02D 35/021; F02D 2200/0414; Y02T 10/42

USPC ............ 123/406.11, 406.12, 406.17, 406.22, 123/406.24, 406.35; 701/103–105
See application file for complete search history.

(56) References Cited

U.S. PATENT DOCUMENTS

| | | | | |
|---|---|---|---|---|
| 2006/0169246 A1* | 8/2006 | Asai | ..................... | F01L 13/0042 123/305 |
| 2007/0215130 A1* | 9/2007 | Shelby | .................. | F02D 19/084 123/637 |
| 2009/0217906 A1* | 9/2009 | Nishimoto | ............ | F02D 13/023 123/348 |

(Continued)

FOREIGN PATENT DOCUMENTS

JP 2001-159348 A 6/2001

*Primary Examiner* — Hieu T Vo
*Assistant Examiner* — Arnold Castro
(74) *Attorney, Agent, or Firm* — Alleman Hall McCoy Russell & Tuttle LLP

(57) ABSTRACT

A method of controlling a spark-ignition engine including an ignition plug for spark-igniting mixture gas inside a cylinder in an engine body, and an effective compression ratio changing module for changing an effective compression ratio of the engine body is provided. The method includes estimating, based on engine speed, engine load, and environmental conditions, a limit effective compression ratio serving as a maximum effective compression ratio where pre-ignition does not occur, calculating a current effective compression ratio, calculating a value obtained by subtracting the effective compression ratio from the limit effective compression ratio, as a margin before pre-ignition occurs, and decreasing, when the margin is below a predetermined minimum margin, the effective compression ratio of the engine body by using the effective compression ratio changing module so that the margin is increased to be above the minimum margin, which is set constant regardless of at least environmental conditions.

20 Claims, 10 Drawing Sheets

(56) References Cited

U.S. PATENT DOCUMENTS

| | | | |
|---|---|---|---|
| 2011/0093186 A1* | 4/2011 | Hagari | F02D 13/0226 701/111 |
| 2011/0106410 A1* | 5/2011 | Yoshino | F02D 13/0226 701/103 |
| 2011/0239986 A1* | 10/2011 | Shishime | F02D 13/0238 123/406.29 |
| 2011/0246049 A1* | 10/2011 | Matsuo | F02D 35/02 701/111 |
| 2012/0067309 A1* | 3/2012 | Murai | F02D 13/0226 123/90.1 |
| 2012/0089315 A1* | 4/2012 | Makino | F02D 13/0238 701/102 |
| 2012/0215419 A1* | 8/2012 | Kamio | F02D 13/0223 701/103 |

* cited by examiner

SPARK-IGNITION ENGINE AND METHOD OF CONTROLLING THE SPARK-IGNITION ENGINE

BACKGROUND

The present invention relates to a method of controlling a spark-ignition engine including an ignition plug that is spark-ignitable to a mixture gas inside a cylinder formed in an engine body.

Conventionally, a method of controlling an engine, to suppress a pre-ignition that is caused by a phenomenon wherein a mixture gas self-ignites before the normal start timing of combustion due to spark-ignition, has been developed. If the pre-ignition occurs, the combustion dramatically speeds up according to the advanced start of combustion, and as a result, engine noise and vibration increase and may cause damage on, for example, a piston. Therefore, it is necessary to more surely avoid the occurrence of pre-ignition.

For example, JP2001-159348A discloses a method of controlling an engine in which a close timing of an intake valve is changed so that an effective compression ratio does not exceed a predetermined maximum value, so as to avoid a pre-ignition.

The maximum value of the effective compression ratio is a threshold where the pre-ignition occurs if the effective compression ratio exceeds said threshold. The maximum value of the effective compression ratio depends on many environmental conditions, and therefore the change of the maximum value according to changes in the environmental conditions is difficult to grasp entirely and accurately. If the change of the maximum value is not appropriately grasped, the effective compression ratio may exceed the actual maximum value and pre-ignition may occur.

The present invention is made in view of the above situation, and further surely avoids an occurrence of pre-ignition.

Means for Solving the Problems

According to one aspect of the invention, a method of controlling a spark-ignition engine including an ignition plug for spark-igniting a mixture gas inside a cylinder formed in an engine body, and an effective compression ratio changing module for changing an effective compression ratio of the engine body is provided. The method includes estimating, based on an engine speed, an engine load, and environmental conditions under which the engine is driven, a limit effective compression ratio serving as a maximum effective compression ratio where a pre-ignition in which the mixture gas self-ignites before a normal start timing of combustion, due to a spark ignition, does not occur, calculating a current effective compression ratio, calculating a value obtained by subtracting the effective compression ratio from the limit effective compression ratio, as a margin before the pre-ignition occurs, and decreasing, when the margin is below a predetermined minimum margin, the effective compression ratio of the engine body by using the effective compression ratio changing module so that the margin is increased to be above the minimum margin, the minimum margin being set constant regardless of at least the environmental conditions.

According to another aspect of the invention, a spark-ignition engine including an ignition plug for spark-igniting a mixture gas inside a cylinder formed in an engine body, an effective compression ratio changing module for changing an effective compression ratio of the engine body, and a controller for controlling an operation of the effective compression ratio changing module is provided. The controller estimates, based on an engine speed, an engine load, and environmental conditions under which the engine is driven, a limit effective compression ratio serving as a maximum effective compression ratio where a pre-ignition, in which the mixture gas self-ignites before a normal start timing of combustion, due to a spark ignition, does not occur. The controller calculates a current effective compression ratio. The controller calculates a difference value obtained by subtracting the effective compression ratio from the limit effective compression ratio, as a margin before the pre-ignition occurs. The controller operates, when the margin is below a predetermined minimum margin, the effective compression ratio changing module to decrease the effective compression ratio of the engine body so that the margin is increased to be above the minimum margin, the minimum margin being set constant regardless of at least the environmental conditions.

In these aspects, after estimating, based on an engine speed, an engine load, and environmental conditions under which the engine is driven, a limit effective compression ratio serving as a maximum effective compression ratio where a pre-ignition does not occur, the current effective compression ratio is maintained at a value below the limit effective compression ratio by over the minimum margin. Therefore, the limit effective compression ratio can further accurately be estimated according to the environmental conditions, and even if an error occurs in the estimation, the effective compression ratio is further surely suppressed to below the limit effective compression ratio and, thereby, the pre-ignition can further surely be avoided. Moreover, the minimum margin that is the minimum value of the margin of the effective compression ratio with respect to the limit effective compression ratio is set constant regardless of the environmental conditions. Therefore, a predetermined margin is surely secured even if the environmental conditions change.

Here, the present inventors have found that among the environmental conditions, an octane number of a fuel, a temperature of intake air, and a temperature of coolant strongly influence on the occurrence of the pre-ignition. Therefore, preferably, the estimating the limit effective compression ratio may include estimating the limit effective compression ratio based on at least an octane number of fuel to be supplied into the cylinder, a temperature of intake air to be sucked into the cylinder, and a temperature of coolant for cooling the engine body.

Further, preferably, the controller may estimate the limit effective compression ratio based on at least an octane number of fuel to be supplied into the cylinder, a temperature of intake air to be sucked into the cylinder, and a temperature of coolant for cooling the engine body.

Preferably, the effective compression ratio changing module may be able to change a close timing of an intake valve provided to the engine body, and decreasing the effective compression ratio may include decreasing the effective compression ratio of the engine body by changing the close timing of the intake valve.

Further, preferably, the effective compression ratio changing module may be able to change a close timing of an intake valve provided to the engine body, and when the margin is below the predetermined minimum margin, the controller may change the close timing of the intake valve by the effective compression ratio changing module.

Thus, unlike in a case where, for example, a stroke amount of a piston is changed to decrease a geometric compression ratio of the engine itself, the effective compression ratio can be decreased with a simple configuration.

Preferably, decreasing the effective compression ratio may be performed within a particular engine driving range where the engine speed is low and the engine load is high in at least a warmed-up state of the engine.

Further, preferably, within a particular engine driving range where the engine speed is low and the engine load is high in at least a warmed-up state of the engine, the controller may operate the effective compression ratio changing module to decrease the effective compression ratio of the engine body.

Thus, under drive conditions where the pre-ignition most easily occurs because the temperature and pressure inside the cylinder easily increase and an actual time length (heat receiving period) during which the fuel is exposed to such an environment is long, the occurrence of the pre-ignition is appropriately checked and, therefore, the pre-ignition can be suppressed.

Preferably, within the particular engine driving range, the mixture gas may be spark-ignited by the ignition plug at a timing retarded from a top dead center on compression stroke.

Further, preferably, within the particular engine driving range, the controller may spark-ignite the mixture gas by the ignition plug at a timing retarded from a top dead center on compression stroke.

Thus, in the case where the combustion is started on the retarding side of the top dead center on the compression stroke, the pre-ignition can be suppressed by decreasing the temperature inside the cylinder, and because an unburnt mixture gas (end gas) is difficult to self-ignite on a combustion stroke after the ignition, knocking can also effectively be suppressed.

Preferably, the method may further include using an injector for injecting the fuel into the cylinder. Within the particular engine driving range, a late stage injection, in which the fuel is injected into the cylinder by the injector at a late stage timing set during the compression stroke, may be performed, and an early stage injection, in which the fuel is injected into the cylinder by the injector at a timing set to be more advanced than the late stage injection timing may be performed.

Further, preferably, the spark-ignition engine may include an injector for injecting the fuel into the cylinder. The controller may be able to control an operation of the injector, and within the particular engine driving range, inject the fuel into the cylinder by the injector at a late stage timing set during the compression stroke and inject the fuel into the cylinder by the injector at a timing set to be more advanced than the late stage injection timing.

Thus, the cylinder is effectively cooled therein by a latent heat of vaporization of fuel injected on the compression stroke. Therefore, under the driving conditions where the pre-ignition most easily occurs, the occurrence of pre-ignition can be suppressed in advance.

Moreover, preferably, the method may further include using a detector for detecting the pre-ignition, decreasing, when the detector detects the pre-ignition, by the effective compression ratio changing module, the effective compression ratio of the engine body by a predetermined amount, and temporarily enriching an air-fuel ratio within the cylinder in a transient period from the start of decreasing the effective compression ratio by the predetermined amount until the completion of the decrease of the effective compression ratio of the engine body, the air-fuel ratio being based on the fuel injected from the injector.

Further, preferably, the spark-ignition engine may further include a detector for detecting the pre-ignition. When the detector detects the pre-ignition, the controller may decrease, by the effective compression ratio changing module, the effective compression ratio of the engine body by a predetermined amount, and temporarily enrich an air-fuel ratio within the cylinder in a transient period from the start of the decrease of the effective compression ratio until the completion thereof, the air-fuel ratio being based on the fuel injected from the injector.

Thus, even if the pre-ignition occurs, the pre-ignition can be stopped by decreasing the effective compression ratio. Moreover, during the time from the transient period until the decrease of the effective compression ratio is completed, the internal cylinder temperature can appropriately be decreased under the rich environment ($\lambda<1$) and, by resuming the environment to near $\lambda=1$ immediately after the decrease of the effective compression ratio is completed, the combustion in the rich state can be finished in the shortest possible time period.

DETAILED DESCRIPTION OF THE EMBODIMENT (1) Entire Configuration of Engine

Figure 1:
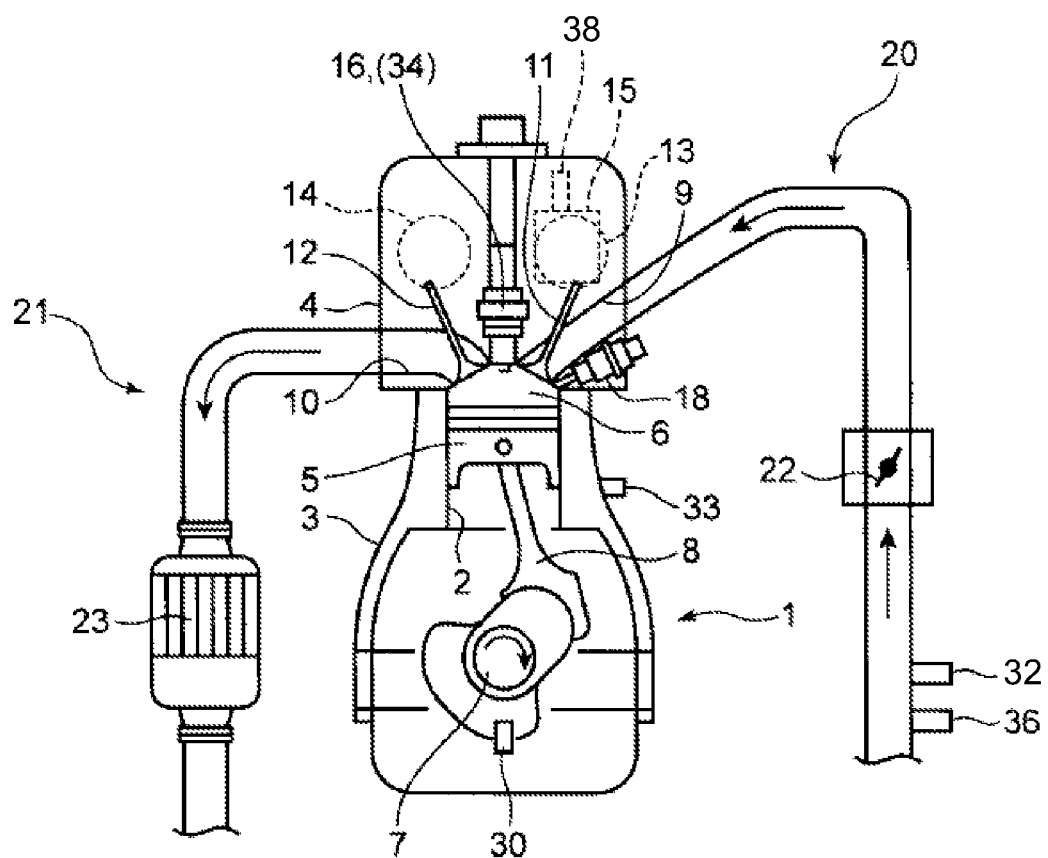
FIG. 1 is a diagram showing an entire configuration of an engine according to an embodiment of the invention.

FIG. 1 is a diagram showing an entire configuration of an engine according to an embodiment of the invention. The engine shown in FIG. 1 is a spark-ignition multi-cylinder gasoline engine using gasoline as a fuel. This engine includes a cylinder block 3 having a plurality of cylinders 2 aligned in a direction toward which the cylinders overlap with each other in FIG. 1 (only one cylinder is illustrated in FIG. 1), and an engine body 1 having a cylinder head 4 provided on top of the cylinder block 3. Further, the engine is to be mounted on a vehicle and is arranged in an engine room (located outside the range of FIG. 1) as a power source for driving the vehicle.

A piston 5 is reciprocatably inserted into each cylinder 2 of the engine body 1. Each of the pistons 5 is coupled to a crankshaft 7 via a connecting rod 8. The crankshaft 7 revolves about its central axis corresponding to the reciprocating motion of the pistons 5.

An engine speed sensor 30 for detecting a revolving speed of the crankshaft 7 as an engine speed is provided on the cylinder block 3.

A combustion chamber 6 is formed above each piston 5. An intake port 9 and an exhaust port 10 are opened for each combustion chamber 6. An intake valve 11 for opening and closing the intake port 9 and an exhaust valve 12 for opening and closing the exhaust port 10 are provided in the cylinder head 4 for each intake port 9 and exhaust port 10, respectively. In association with the revolution of the crankshaft 7, the intake valves 11 are opened and closed by a valve operating mechanism 13 and the exhaust valves 12 are opened and closed by a valve operating mechanism 14, the valve operating mechanisms 13 and 14 including, for example, a pair of cam shafts (not illustrated) arranged in the cylinder head 4.

The valve operating mechanism 13 for the intake valves 11 is installed with a VVT 15. The VVT 15 is a so called variable valve timing mechanism, and variably sets operation timings of the intake valves 11. The operation timings of the intake valves 11, including an actual close timing IVC_r that is a timing to actually close the intake valve 11, are detected by a cam angle sensor 38 provided to the VVT 15.

As the VVT 15, although various forms of VVTs are substantially used and well known already, for example, a hydraulic variable mechanism may be used as the VVT 15. Note that, although it is not illustrated, the hydraulic variable mechanism has a driven shaft arranged coaxially with the camshaft for the intake valve 11, and a plurality of fluid chambers arranged between the camshaft and the driven shaft so as to align in a circumferential direction of the driven shaft. By generating a predetermined pressure difference between the fluid chambers, a phase difference is generated between the cam shaft and the driven shaft. Further, by variably setting the phase difference within a predetermined angle range, the operation timings of the intake valve 11 are continuously changed.

Note that, as the VVT 15, a variable mechanism of a type that changes the close timing of the intake valve 11 by changing a valve lift may be provided. Alternatively, such a lift variable mechanism and the phase variable mechanism may be combined to be used.

In the cylinder head 4 of the engine body 1, an ignition plug 16 and an injector 18 are provided as a set for each cylinder 2.

The injector 18 is arranged to face the combustion chamber 6 from an intake side thereof, and injects the fuel (gasoline) supplied from a fuel supply tube (located outside the range of FIG. 1) from its tip part. When the fuel is injected from the injector 18 to the combustion chamber 6, the injected fuel mixes with air, and a mixture gas at a desired air-fuel ratio is produced inside the combustion chamber 6.

The ignition plug 16 is arranged to face the combustion chamber 6 from upward, and discharges a spark from its tip part according to a power feed from an ignition circuit thereof (located outside the range of FIG. 1). Due to the spark being discharged from the ignition plug 16 at a predetermined timing, combustion of the mixture gas starts.

Figure 2:
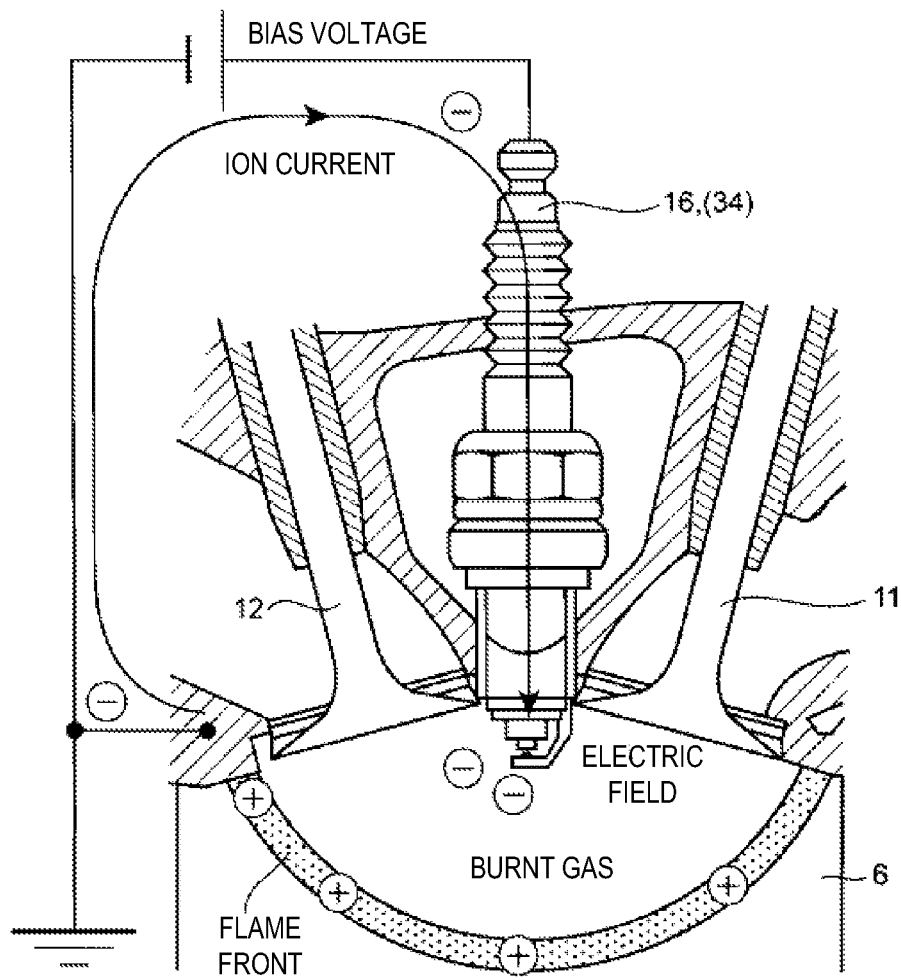
FIG. 2 is a schematic diagram explaining a configuration of an ion current sensor included in the engine.

The ignition plug 16 is internally built with an ion current sensor 34 for detecting a flame caused by the combustion of the mixture gas inside the combustion chamber 6. As shown in FIG. 2, the ion current sensor 34 applies a predetermined bias voltage (e.g., about 100V) to an electrode of the ignition plug 16 and, thereby, detects an ion current generated when the flame is generated around the electrode. In this embodiment, the occurrence of the pre-ignition is detected by using the ion current sensor 34. Specifically, a pre-ignition detecting module of an ECU 40 (described below) detects the occurrence of the pre-ignition by using a detection value of the ion current sensor 34.

Pre-ignition is an abnormal combustion phenomenon in which a mixture gas self-ignites before a normal start timing of combustion due to a spark-ignition in a case where, for example, a temperature and a pressure inside the combustion chamber 6 excessively increase. With the pre-ignition, the combustion dramatically speeds up according to the advanced self-ignition of the mixture gas. Therefore, the engine noise greatly increases as well as the engine vibration and, for example, the pistons may be damaged. Thus, as described below, the engine of this embodiment performs a control for preventing the occurrence of the pre-ignition, detects the occurrence of the pre-ignition by using the ion current sensor 34, and, if the pre-ignition is detected, promptly performs a control for stopping the pre-ignition.

Hereinafter, a method of detecting the pre-ignition by using the ion current sensor 34 is specifically explained based on the view in FIG. 5. In the view, the waveform in a solid line J0 indicates a distribution (time change) of a heat release rate when the mixture gas is normally combusted due to a spark-ignition IG. Further, a leftward waveform J1 indicates a distribution of a heat release rate when the pre-ignition occurs.

As is clear from the waveform J0, in the case of normal combustion, when the spark-ignition is performed by the ignition plug 16, normally the combustion starts after a predetermined retarded time period from the spark-ignition. Therefore, a time point t0 (a substantial combustion start timing) where the combustion progresses to the extent that the ion current sensor 34 can detect the flame is retarded from the time point of the spark-ignition IG by a predetermined crank angle. Note that, in the example shown in FIG. 5, the timing of the spark-ignition IG is set to be slightly retarded from a top dead center (hereinafter, may simply be referred to as the "TDC") on compression stroke (the top dead center between compression stroke and expansion stroke), and the combustion substantially starts at the timing t0 further retarded from the spark-ignition timing.

On the other hand, as is clear from the waveform J1 with the pre-ignition, if the pre-ignition occurs, the combustion starts earlier than the normal combustion start timing t0 (in the example shown in FIG. 5, a time point t1 that is slightly earlier than the compression TDC), and the combustion accordingly speeds up. Thus, in this embodiment, when the ion current sensor 34 detects the flame at a time point earlier than the normal combustion start timing t0 by over a predetermined determined time period, the pre-ignition detecting module 42 determines that the pre-ignition is in progress.

Note that, for further accurately detecting the pre-ignition, the time period for the determination is preferred to be shorter. However, if the time period for the determination is excessively short, even the normal combustion is determined to be the pre-ignition when the start timing thereof is slightly shifted, and stability in controlling the combustion is lacking. Moreover, originally, between a time point immediately before the spark-ignition IG and a time point after the spark-ignition IG by a predetermined time period (time period Z in FIG. 5), the voltage between the electrodes of the ignition plug 16 greatly varies because the spark-ignition IG is performed, and therefore, it is impossible to detect the ion current during the time period Z. Thus, considering the stability in the controls above and the restriction on a system, in this embodiment, if a timing for the ion current sensor 34 to detect the flame is advanced to a time point that is slightly earlier than the period Z where the voltage varies (for example, around the time point t1), the pre-ignition is determined to be in progress.

Further, a vibration sensor 33 for detecting a vibration of the cylinder block 3, that is, knocking (i.e., knock sensor), is provided to the cylinder block 3. Specifically, the knock sensor 33 detects a maximum value of vibration strength of the cylinder block 3, and the ECU 40 (described below) detects the occurrence of knocking with a vibration strength above a predetermined value.

Knocking is a phenomenon in which, after combustion of the mixture gas begins due to the spark-ignition (flame propagating combustion), an unburnt part of the mixture gas (end gas) self-ignites while in a process of flame propagation. Also in the case where knocking is caused, the engine noise may greatly increase and, for example, the pistons may be damaged. Thus, with the engine of this embodiment, the occurrence of knocking is detected by using the vibration sensor 33. Specifically, when the vibration strength of the engine body 1 detected by the vibration sensor 33 exceeds a predetermined reference level, a knocking determining module (not illustrated) of the ECU 40 determines that knocking is caused. Further, when the knocking is detected, a control for avoiding the knocking is performed.

Note that, at the time of knocking, because the generation timing of the flame does not change from the case of normal combustion, the ion current sensor 34 cannot detect the occurrence of knocking Whereas, the engine vibration also increases at the time of pre-ignition. Therefore, the pre-ignition can be detected by using the vibration sensor 33. Therefore, in view of, for example, reduction of the number of sensors, the ion current sensor 34 may be omitted and the pre-ignition may be detected by the vibration sensor 33. However, in this embodiment, the two sensors 33 and 34 are both provided, and the ion current sensor 34 detects the pre-ignition.

Further, in this embodiment, the detection value of the vibration sensor 33 is also used in estimating an octane number of fuel to be injected from the injectors 18. Specifically, an octane number estimating module 46 of the ECU 40 (described below) estimates the octane number of the fuel by using the detection value. The estimation value of the octane number is used in a control of maintaining a pre-ignition margin.

The vibration strength of the cylinder block 3 decreases more the higher the octane number of the fuel to be supplied, which corresponds to a higher anti-knocking ability. Therefore, the octane number estimating module 46 estimates the octane number smaller as the maximum value of the vibration strength of the cylinder block 3 detected by the vibration sensor 33 increases. Specifically, a map of the octane number for the maximum value of the vibration strength of the cylinder block 3 is obtained in advance by for example experimentation, and is stored in a storing module 41 of the ECU (described later), and the octane number estimating module 46 estimates the value corresponding to the maximum value of the vibration strength detected by the vibration sensor 33 as a current octane number.

Here, the maximum value of the vibration strength also changes in a case where a geometric compression ratio of the engine body 1 changes (the geometric compression ratio of the engine body 1 changes due to, for example, variation in manufacturing and adhesion of carbon onto, for example, the intake valves) in addition to the octane number of the fuel. Specifically, the combustion dramatically speeds up as the geometric compression ratio increases and a temperature of the engine at the end of compression stroke increases, and accordingly, the vibration strength of the cylinder block 3 increases. However, in this embodiment, any changes in the vibration strength are considered as changes of the octane number. This is to estimate, based on the estimated octane number, a limit effective compression ratio, that is a maximum value of an effective compression ratio (a substantial compression ratio determined based on the close timing of the intake valve) at which the pre-ignition does not occur, and is based on a reason that because a correlation between the octane number for the limit effective compression ratio and the geometric compression ratio is in agreement with a correlation between the octane number for the vibration strength and the geometric compression ratio, even if any change of the vibration strength is considered as the change of the octane number, the limit effective compression ratio can appropriately be estimated.

Specifically, because an ignition temperature of fuel increases as the octane number increases, it becomes more difficult for the pre-ignition to occur and the limit effective compression ratio increases. Further, the vibration strength reduces as the octane number increases. On the other hand, it becomes more difficult for the pre-ignition to occur as the geometric compression ratio decreases, and the limit effective compression ratio increases. Further, the vibration strength reduces as the geometric compression ratio decreases. Therefore, in this embodiment, the change in the maximum value of the vibration strength of the cylinder block 3 corresponding to the change of the octane number and the change of the geometric compression ratio is considered to be due to the change of the octane number as a whole.

Note that, an internal cylinder pressure sensor for detecting a pressure inside the cylinder may be provided and the geometric compression ratio may be detected by using the internal cylinder pressure sensor. Thereby, the octane number of the fuel and the geometric compression ratio may be estimated by excluding an influence of the geometric compression ratio from the detection value of the vibration sensor 33.

Again with reference to FIG. 1, the entire configuration of the engine is explained. A water jacket where a coolant flows therein (not illustrated) is provided inside the cylinder block 3 and the cylinder head 4 of the engine body 1. An engine coolant temperature sensor 31 for detecting a temperature of coolant inside the water jacket is provided to the cylinder block 3.

An intake passage 20 and an exhaust passage 21 are connected with the intake ports 9 and the exhaust ports 10 of the engine body 1, respectively. An air for combustion (fresh air) is supplied to the combustion chambers 6 through the intake passage 20 and the burnt gas (exhaust gas) produced in the combustion chambers 6 is discharged outside through the exhaust passage 21.

Within the intake passage 20, a throttle valve 22 for adjusting a flow rate of the intake air to flow into the engine body 1, an airflow sensor 32 for detecting the flow rate of the intake air, and an intake air temperature sensor 36 for detecting a temperature of intake air are provided.

The throttle valve 22 is configured as an electronically-controlled throttle valve and is opened and closed electrically according to an opening of an accelerator (located outside the range of FIG. 1) operated through being depressed by a driver. That is, an accelerator position sensor 35 (see FIG. 3) is provided to the accelerator, and an electric actuator (located outside the range of FIG. 1) opens and closes the throttle valve 22 according to the opening of the accelerator detected by the accelerator position sensor 35 (accelerator position).

A catalyst converter 23 for exhaust gas purification is provided within the exhaust passage 21. The catalyst converter 23 is built with, for example, a three-way catalyst, and hazardous components contained in the exhaust gas passing through the exhaust passage 21 are purified by the function of the three-way catalyst.

Further, an external air pressure sensor 37 (see FIG. 3) for detecting an external air pressure that is a pressure of the external air (atmospheric pressure) is also provided in a predetermined position of the vehicle.

(2) Control System

Figure 3:
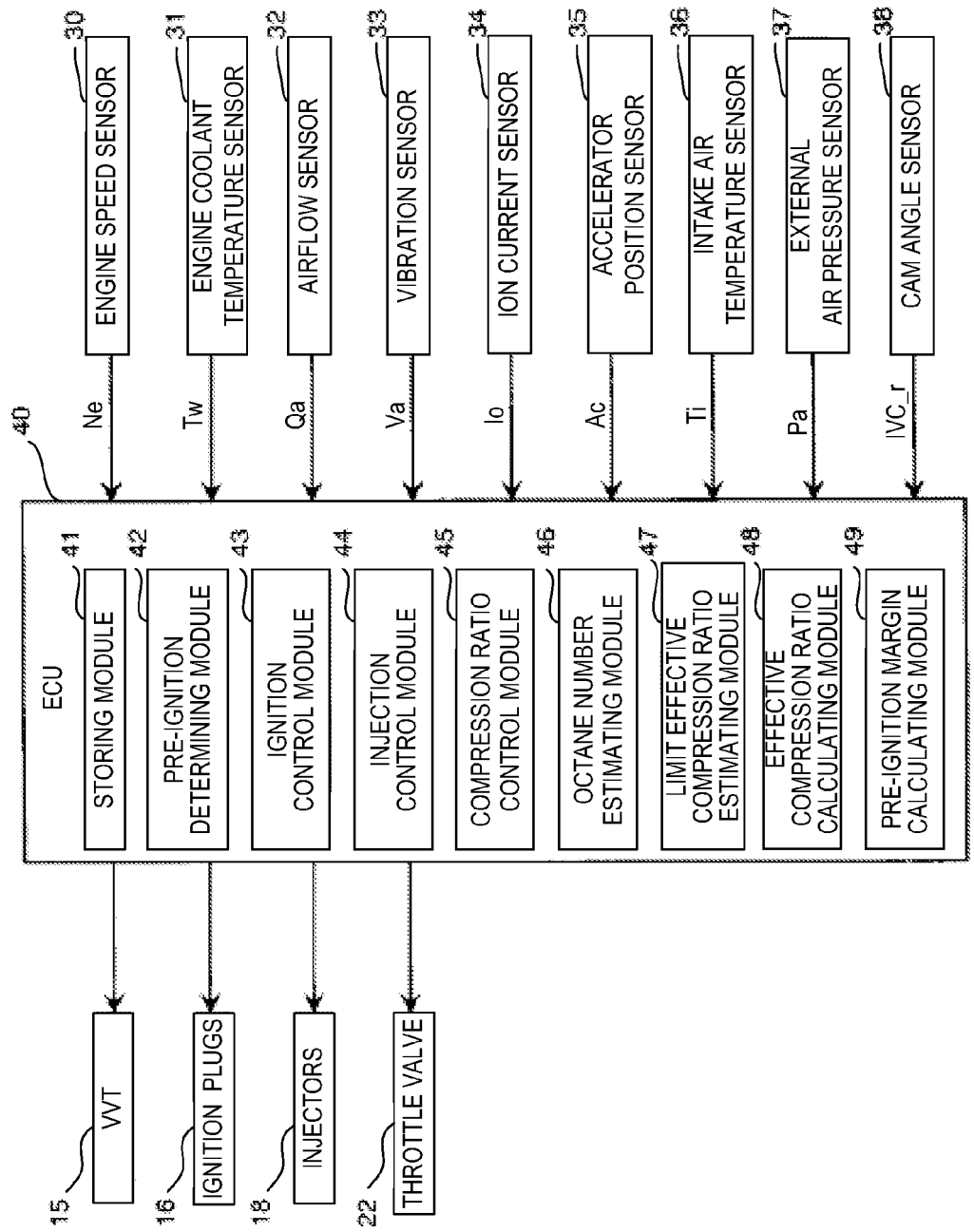
FIG. 3 is a block diagram showing a control system of the engine.

FIG. 3 is a block diagram showing a control system of the engine. The ECU 40 shown in FIG. 3 serves as a control unit for collectively controlling each component of the engine, and is configured with, for example, a well known CPU, ROM and RAM.

The ECU 40 is inputted with the detection signals from the various sensors. That is, the ECU 40 is electrically connected with the engine speed sensor 30, the engine coolant temperature sensor 31, the airflow sensor 32, the vibration sensor 33, the ion current sensor 34, the accelerator position sensor 35, the intake air temperature sensor 36, the external air pressure sensor 37, and the cam angle sensor 38. Moreover, as the detection values from the sensors 30 to 38, information such as the engine speed Ne, the coolant temperature Tw, the intake air amount Qa, the vibration strength Va, the ion current value Io, the accelerator position AC, the intake air temperature Ti, the external air pressure Pa, and the actual close timing of the intake valve 11 (IVC_r) are sequentially inputted to the ECU 40.

The ECU 40 is further electrically connected with the VVT 15, the ignition plugs 16, the injectors 18, and the throttle valve 22, and outputs control signals for actuation to these components.

The further specific function of the ECU 40 is explained as follows. The ECU 40 has, as its main functional elements, the storing module 41, the pre-ignition determining module 42, an ignition control module 43, an injection control module 44, a compression ratio control module 45, the octane number estimating module 46, a limit effective compression ratio estimating module 47, an effective compression ratio calculating module 48, and a pre-ignition margin calculating module 49.

The storing module 41 stores various kinds of data and programs required in controlling the engine.

Figure 4:
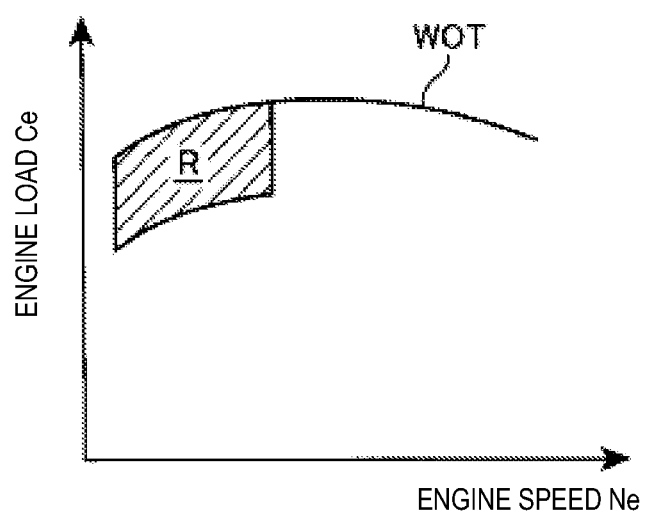
FIG. 4 is an explanation chart of a particular engine driving range within which a pre-ignition easily occurs.

The storing module 41 stores an area of a particular engine driving range R shown in FIG. 4. The particular engine driving range R is an engine driving range where the pre-ignition may occur, and is set to near a maximum engine load line WOT (i.e., high engine load) and on a side where the engine speed is relatively low.

That is, because the pre-ignition is, as described above, a phenomenon in which the mixture gas self-ignites before the normal start timing of combustion due to the spark-ignition, the pre-ignition most easily occurs within an engine driving range where the engine speed is low and the engine load is high, in which the air inside the combustion chamber 6 increases in temperature and pressure and a heat receiving time period of the fuel (the actual time length during which the fuel is exposed to an environment with high temperature and pressure) becomes long. Therefore, as shown in FIG. 4, the engine driving range where the engine speed Ne is comparatively low and the engine load Ce is high is set as the particular engine driving range R where the pre-ignition may possibly occur.

Note that, if the engine is in a cold state, a temperature of a wall of the combustion chamber 6 is thereby low, therefore, it is difficult for the pre-ignition to occur even within the engine driving range where the engine speed and load are high. Therefore, a map in which the particular engine driving range R as above is set (range determination map) is only used when the engine is in a warmed-up state (the coolant temperature of the engine is high).

The map of the octane number for the maximum value of the vibration strength of the cylinder block 3 is stored in the storing module 41.

Further, a reference value of the limit effective compression ratio that is the maximum value of the effective compression ratio at which the pre-ignition does not occur (reference limit effective compression ratio) is stored in the storing module 41. The reference limit effective compression ratio is obtained by either one of an experiment and a calculation according to the engine speed Ne and the engine load Ce, and the storing module 41 stores the reference limit effective compression ratio with respect to the engine speed Ne and the engine load Ce, in the form of a map.

The reference limit effective compression ratio is a value under which drive conditions excluded therefrom with operation input conditions according to the engine speed Ne and the engine load Ce are determined through the operation by the driver, and when environmental conditions that change regardless of the operation by the driver are predetermined reference conditions. That is, although the limit effective compression ratio changes based on the environmental conditions, such as the octane number of fuel, apart from the engine speed Ne and the engine load Ce, the reference limit effective compression ratio is the value under the environmental conditions, such as with a predetermined octane number.

Further, the storing module 41 stores, in the form of map, the effective compression ratio for the close timing IVC of the intake valve 11. The effective compression ratio is obtained by either one of an experiment and a calculation.

The effective compression ratio calculating module 48 calculates a current effective compression ratio CR of the engine body 1. The effective compression ratio calculating module 48 extracts the value corresponding to the current actual close timing IVC_r of the intake valve 11 from the map of effective compression ratio stored in the storing module 41, and determines the extracted value to be the current effective compression ratio CR.

The limit effective compression ratio estimating module 47 estimates a limit effective compression ratio CR_max under current drive conditions. As described above, the limit effective compression ratio changes according to the environmental conditions, such as the octane number of fuel, in addition to the operation input conditions, such as the engine speed Ne and the engine load Ce. Therefore, the limit effective compression ratio estimating module 47 extracts the reference value of the limit effective compression ratio according to the current engine speed Ne and the engine load Ce from the map of reference limit effective compression ratio stored in the storing module 41, corrects the extracted value according to current environmental conditions, and determines the value after the correction to be the limit effective compression ratio CR_max.

The octane number of fuel, the geometric compression ratio, the intake air temperature, the engine coolant temperature, and the external air pressure are mainly known to be the environmental conditions that influence the limit effective compression ratio. That is, if the octane number of fuel reduces and the geometric compression ratio increases as described above, the pre-ignition easily occurs and the limit effective compression ratio decreases. Further, if any one of the intake air temperature, the engine coolant temperature, and the external air pressure or the intake air pressure (internal cylinder pressure when the compression stroke starts) increases, the temperature and pressure inside the cylinder at the end of compression stroke increase, and therefore, the pre-ignition easily occurs and the limit effective compression ratio decreases.

Thus, by using the octane number of fuel, the geometric compression ratio, the intake air temperature, the engine coolant temperature, and the external air pressure, the limit effective compression ratio estimating module 47 corrects the reference limit effective compression ratio obtained according to the engine speed Ne and the engine load Ce. Specifically, the storing module 41 is stored with correction amounts for the limit effective compression ratio respectively according to the octane number of fuel, the intake air temperature, the coolant temperature, and the external air pressure in advance. The limit effective compression ratio estimating module 47 extracts each correction amount corresponding to each of the values of the octane number estimated by the octane number estimating module 46, the intake air temperature, the coolant temperature, and the external air pressure, and the limit effective compression estimating module 47 corrects the reference limit effective compression ratio by using the correction amounts to estimate the limit effective compression ratio CR_max.

Here, as described above, the octane number estimated by the octane number estimating module 46 is a value that is computed by combining the geometric compression ratio and the octane number of the fuel, and converting the result into the octane number. Therefore, the correction based on the estimated octane number indicates the correction by the octane number of the fuel and the geometric compression ratio.

The pre-ignition margin calculating module 49 calculates, under the current drive conditions, a margin of the effective compression ratio before the pre-ignition occurs, that is a margin with respect to the limit effective compression ratio. Specifically, the pre-ignition margin calculating module 49 calculates a value obtained through subtracting the effective compression ratio CR from the limit effective compression ratio CR_max, as a margin CR_mrg (CR_mrg=CR_max−CR).

The pre-ignition determining module 42 determines whether the pre-ignition is in progress, based on the detection value of the ion current sensor 34. Specifically, when the driving state of the engine is in the particular engine driving range R, the pre-ignition determining module 42 specifies the flame generation timing (substantial combustion start timing) based on the detection value of the ion current sensor 34, and, by comparing the flame generation timing with the normal combustion start timing, it determines whether the pre-ignition has occurred. Note that, the information on the normal combustion start timing is obtained in advance by, for example, either one of an experiment and a calculation and is stored in the storing module 41.

The ignition control module 43 controls, for example, a timing (ignition timing) at which the ignition plug 16 performs the spark-ignition, by outputting the power feeding signal to the ignition circuit of the ignition plug 16 at a predetermined timing determined in advance according to the driving state of the engine.

Figure 5:
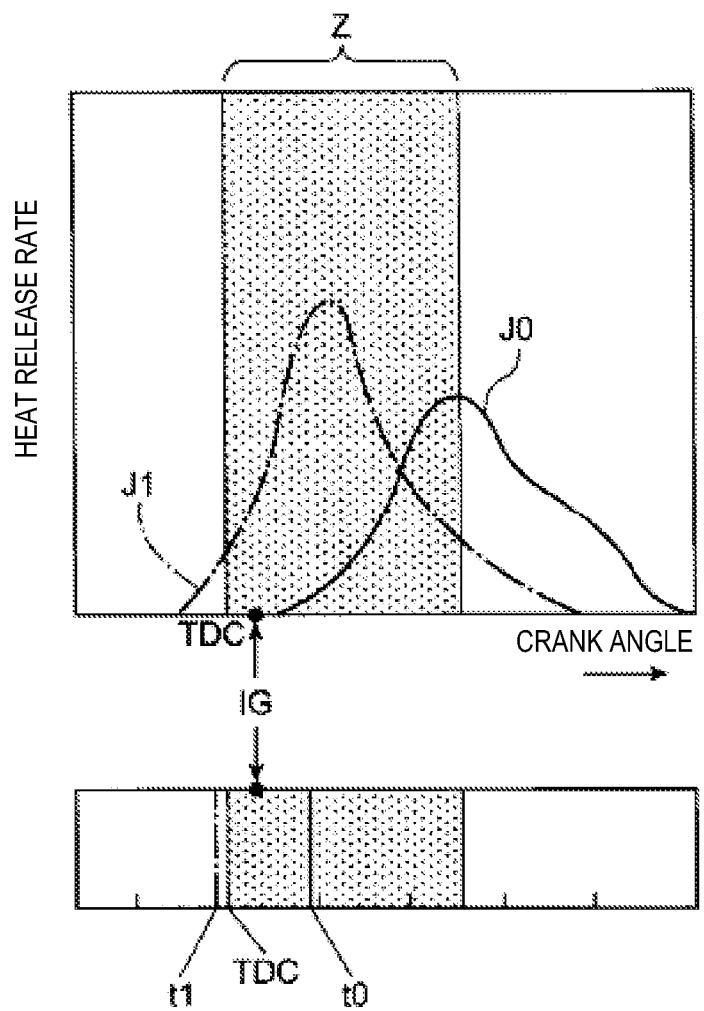
FIG. 5 is a view explaining a method of detecting the pre-ignition.

For example, within the particular engine driving range R where the engine speed is low and the engine load is high, as shown in FIG. 5, the ignition plug 16 is controlled so that the timing (ignition timing) at which the spark-ignition (IG) is performed is set to a timing slightly retarded from the compression TDC. The purpose of retarding the ignition timing than the compression TDC within the particular engine driving range R where the pre-ignition easily occurs as above is to prevent knocking within the range R because, needless to say, knocking also easily occurs within the particular engine driving range R where the pre-ignition easily occurs.

Further, if the knocking determining module (not illustrated) of the ECU 40 detects knocking based on the detection value of the vibration sensor 33, the ignition control module 43 retards the ignition timing so as to avoid the knocking.

The injection control module 44 controls injection amount and timing of the fuel to be injected from the injector 18 to the combustion chamber 6. Further specifically, the injection control module 44 calculates target injection amount and timing of the fuel based on the information on, for example, the engine speed Ne inputted from the engine speed sensor 30 and the intake air amount Qa inputted from the airflow sensor 32, and controls opening start timing and opened period of the injector 18 based on the calculation result.

Especially, within the particular engine driving range R where the pre-ignition easily occurs, the injection control module 44 injects a part of the fuel that should be injected from the injector 18 (the fuel that should be injected from the injector 18 in one combustion cycle) at a late stage injection timing set to during the compression stroke (late stage injection) and injects the rest of the fuel at an early stage injection timing (early stage injection) set to be advanced from the late stage injection timing so as to suppress the occurrence of the pre-ignition beforehand (i.e., regardless of the pre-ignition). In this embodiment, the late stage injection timing is set during the compression stroke after the intermediate stage thereof (see FIG. 8B).

Note that, even if such a compression stroke injection in which the fuel is partially injected on the compression stroke is performed, the pre-ignition may occur within the particular engine driving range R. In such a case, as described below, the injection control module 44 increases the fuel injection amount from the injector 18 to temporarily enrich an air-fuel ratio inside the cylinder (air-fuel ratio of the mixture gas formed inside the combustion chamber 6), and thereby, suppresses the occurrence of the pre-ignition.

The compression ratio control module 45 variably sets the effective compression ratio of the engine by driving the VVT 15 to change the close timing of the intake valve 11. That is, the close timing of the intake valve 11 is regularly set to near a bottom dead center (hereinafter, may simply be referred to as the "BDC") on the intake stroke (timing that is slightly after the intake BDC), and thereby, the air that is sucked into the combustion chamber 6 once is not blown back to the intake port 9, and the effective compression ratio that is the substantial compression ratio of the engine is maintained at a value approximately matching with the geometric compression ratio. On the other hand, in a case where the close timing of the intake valve 11 is set to significantly retard from the intake BDC, the effective compression ratio of the engine decreases, and thereby, blow back of the intake air may occur. The compression ratio control module 45 variably sets the effective compression ratio of the engine by driving the VVT 15 to change a retarding amount of the close timing of the intake valve 11. Here, although the effective compression ratio also decreases in a case where the close timing IVC of the intake valve 11 is set to advance more than the intake BDC, in this embodiment, the compression ratio control module 45 decreases the effective compression ratio by increasing the retarding amount of the close timing of the intake valve 11.

The compression ratio control module 45 changes the effective compression ratio by driving the VVT 15 so that the margin CR_mrg calculated by the pre-ignition margin calculating module 49 becomes above a minimum margin CR_mrg0, which is set in advance, within the particular engine driving range R. Specifically, if the margin CR_mrg is below the minimum margin CR_mrg0 within the particular engine driving range R, the compression ratio control module 45 retards the close timing IVC of the intake valve 11 until the margin CR_mrg exceeds the minimum margin CR_mrg0. In detail, during a regular drive, the close timing IVC of the intake valve 11 is controlled to be a basic intake valve close timing IVC0 set in advance according to the engine speed Ne and the engine load Ce, and the compression ratio control module 45 retards the close timing IVC of the intake valve 11 starting from the basic intake valve close timing IVC0. Note that, the storing module 41 is stored with a map of the basic intake valve close timing IVC0 with respect to the engine speed Ne and the engine load Ce.

Thus, with the engine according to this embodiment, the effective compression ratio CR is controlled to be lower than the limit effective compression ratio CR_max by the margin CR_mrg so that the pre-ignition is surely avoided.

The effective compression ratio CR has the margin as above so that even if an error occurs in the estimation of the limit effective compression ratio CR_max, the pre-ignition due to the effective compression ratio CR exceeding the limit effective compression ratio CR_max is surely avoided. Specifically, although, as described above, the limit effective compression ratio CR_max changes according to the engine speed Ne, the octane number, the geometric compression ratio, the intake air temperature, the engine coolant temperature, and the external air pressure, it also slightly changes according to, other than the above, an atomization state and an internal cylinder flow situation of the fuel, which have a possibility of changing every cycle, and an error may occur in the estimation of the limit effective compression ratio CR_max. Further, an error may also occur in the estimation of the limit effective compression ratio CR_max due to detection errors by the vibration sensor 33, the intake air temperature sensor 36, the engine coolant temperature sensor 31, the external air pressure sensor 37, and the engine speed sensor 30. Therefore, the current effective compression ratio CR is decreased to be below the limit effective compression ratio CR_max by the minimum margin in purpose of surely avoiding the pre-ignition even if the estimation error occurs.

Thereby, in this embodiment, the minimum margin CR_mrg0 is set to a value substantially the same as a maximum value of an amount of error in estimating the limit effective compression ratio CR_max. Here, the estimation error is caused by, for example, the detection error of the sensor that has hardly any relation with the drive conditions. Therefore, the maximum value of the estimation error is constant regardless of the drive conditions and, in this embodiment, the minimum margin CR_mrg0 is set to a constant value regardless of the drive conditions (operation input conditions and environmental conditions). The minimum margin is set to be, for example, within 0.5 to 1.0, such as 0.7. Note that, the detection error changes according to the operation input conditions including the engine speed Ne and the engine load Ce and, alternatively, if, for example, the atomization situation of the fuel changes according to the operation input conditions, the minimum margin CR_mrg0 may be changed according to the operation input conditions.

Further, if the pre-ignition is detected, the compression ratio control module 45 decreases the effective compression ratio by retarding the close timing of the intake valve 11 to suppress the occurrence of the pre-ignition.

Note that, the phrase "the close timing of the intake valve 11" in the above description indicates a close timing in a case where an area of a lift curve of the intake valve 11 other than ramp parts thereof (lash ramp areas where the lift gently increases/decreases) are defined as the opening period of the valve, and it does not indicate a timing when the lift of the intake valve 11 becomes completely zero.

(3) Control Operation for Avoiding Pre-Ignition

Next, the control operation performed by the ECU 40 configured as above is explained. In this embodiment, as described above, the pre-ignition margin maintaining control of allowing the current effective compression ratio CR to have a margin with respect to the limit effective compression ratio CR_max is performed within the particular engine driving range R so as to surely avoid the pre-ignition, and, if the pre-ignition is detected within the particular engine driving range R, the pre-ignition stop control of preventing a continuous occurrence of the pre-ignition thereafter is performed. Hereafter, the pre-ignition avoiding control constituted with the pre-ignition margin maintaining control and the pre-ignition stop control is mainly explained.

Figure 6:
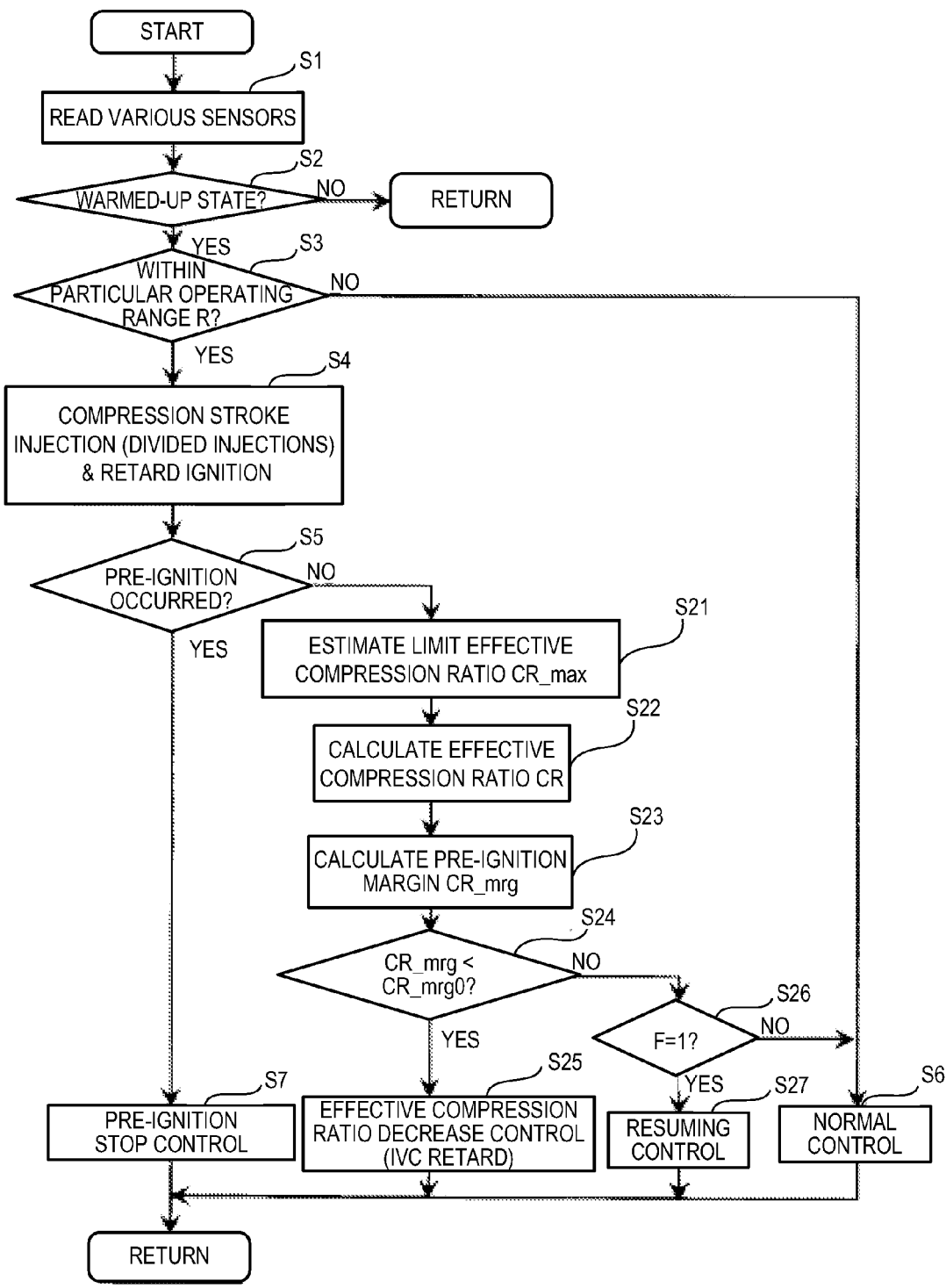
FIG. 6 is a flowchart showing a control operation executed within the particular engine driving range.
Figure 7:
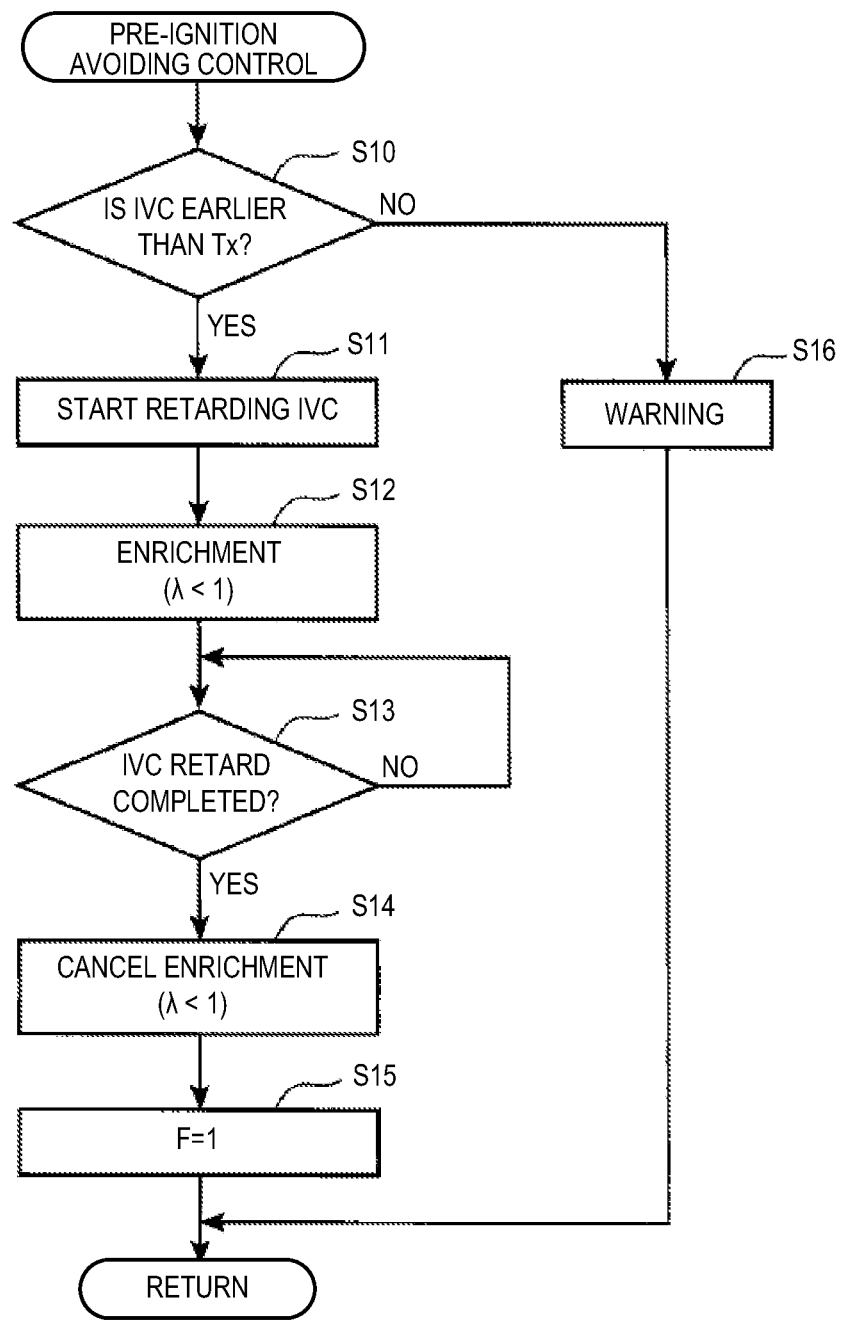
FIG. 7 is a subroutine showing specific contents of a pre-ignition stop control contained in the flowchart of FIG. 5.

FIGS. 6 and 7 are flowcharts for explaining the control operation. When first processing shown in the flowchart in FIG. 6 starts, a control of reading various kinds of sensor values is executed (Step S1). Specifically, the engine speed Ne, the coolant temperature Tw, the intake air amount Qa, the vibration strength Va, the ion current value Io, the accelerator position AC, the intake air temperature Ti, and the external air pressure Pa are read from the engine speed sensor 30, the engine coolant temperature sensor 31, the airflow sensor 32, the vibration sensor 33, the ion current sensor 34, the accelerator position sensor 35, the intake air temperature sensor 36, and the external air pressure sensor 37, respectively, and they are inputted into the ECU 40.

Next, based on whether the coolant temperature Tw read at Step S1 is a predetermined threshold (e.g., 80° C.), it is determined whether the engine is in the warmed-up state (Step S2).

Further, if the engine is confirmed to be in the warmed-up state (the determination at Step S2: YES), it is determined whether a current driving point of the engine (a point on a range determination map specified from the engine speed Ne and the engine load Ce) is within the particular engine driving range R shown in FIG. 4 (Step S3). Specifically, it is determined if the engine speed Ne read at Step S1 and the engine load Ce calculated based on the intake air amount Qa (or the accelerator position AC) are contained within the particular engine driving range R in FIG. 4.

If the engine speed Ne and the engine load Ce are confirmed to be outside the particular engine driving range R (the determination at Step S3: NO), because the pre-ignition does not occur therein, later described controls Steps S7 and S27 (pre-ignition stop control and resuming control) are no longer necessary, and regular drive is maintained (Step S6). That is, for example, the injection amount and timing of the fuel, and the operation timing of the intake valve 11 are controlled in accordance with target values for regular cases that are determined in advance according to the drive state.

Figure 8A:
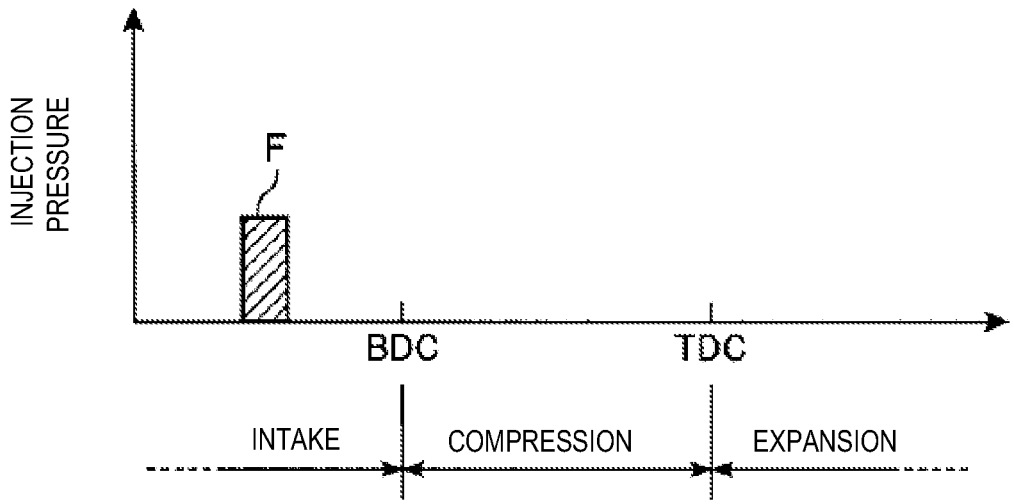
FIG. 8A is a chart showing an injection timing of a fuel in a regular state of the engine.
Figure 8B:
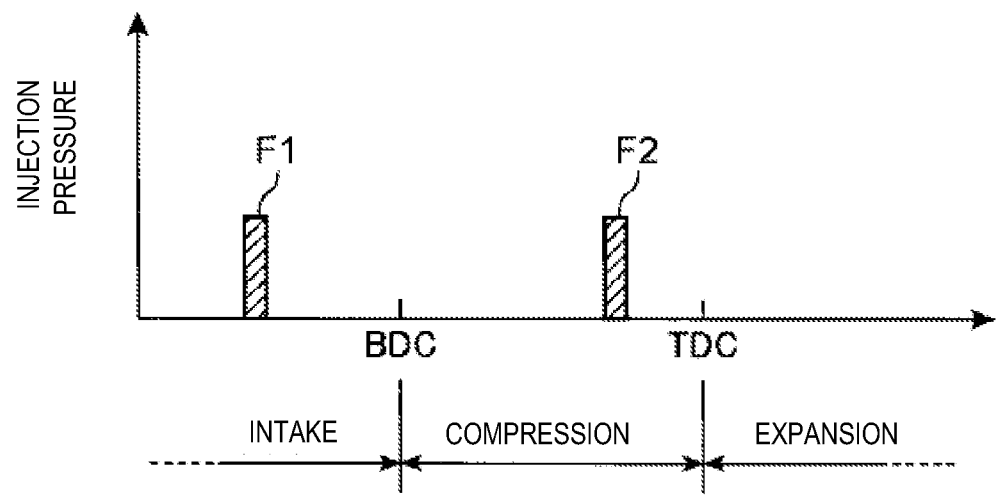
FIG. 8B is a chart showing an injection timing of the fuel within the particular engine driving range.

If the engine speed Ne and the engine load Ce are confirmed to be within the particular engine driving range R (the determination at Step S3: YES), the control of injecting the part of the fuel to be injected from the injector 18 on the compression stroke is executed (Step S4). That is, as shown in FIG. 8, the fuel is entirely injected on the intake stroke within most of the engine driving ranges except for the particular engine driving range R (see the part "F" in FIG. 8A), whereas, by retarding the injection timing of the part of the fuel to be injected to the compression stroke after the intermediate stage thereof, the fuel is injected while being divided to the intake stroke and the compression stroke (see the parts "F1" and "F2" in FIG. 8B).

Such a compression stroke injection (divided injections) of the part of the fuel is performed to prevent the occurrence of pre-ignition beforehand. As described above, within the particular engine driving range R where the engine speed is low and the engine load is high, the temperature and pressure inside the cylinder easily increase and the actual time length (heat receiving period) in which the fuel is exposed to such an environment is long, the pre-ignition most easily occurs within the particular engine driving range R. Thus, within the particular engine driving range R, by executing the control of injecting the part of the fuel to be injected from the injector 18 on the compression stroke after the intermediate stage thereof, decreasing the temperature at the end of the compression stroke (internal cylinder temperature near the compression TDC) with a latent heat of vaporization of the fuel, and shortening the heat receiving period of the fuel, the possibility of the pre-ignition to occur is reduced in advance.

Further, within the particular engine driving range R, together with the above divided injections of the fuel, the control of retarding the timing of spark-ignition (ignition timing) by the ignition plug 16 to after the compression TDC is executed (Step S4). By setting the retarded ignition timing, the combustion starts from the retarding side of the compression TDC (i.e., in a state in which the internal cylinder temperature and pressure inside the cylinder are further decreased), therefore, in the following combustion process, the unburnt mixture gas (end gas) becomes difficult to self-ignite and knocking is suppressed.

After performing the processing at Step S4 (the divided injections of the fuel and the retarding of the ignition), it is determined whether the occurrence of pre-ignition is in progress based on the ion current value Io read at Step S1 (Step S5). Specifically, the generation timing of the flame is specified from the ion current value Io, and in a case where the timing is more advanced than the normal combustion start timing stored in the storing module 41 by over a predetermined time length (e.g., in a case of being advanced to about the time point t1 in FIG. 5), the pre-ignition is determined to have occurred.

When the occurrence of pre-ignition is not detected (the determination at Step S5: NO), the limit effective compression ratio CR_max is estimated (Step S21). Specifically, the reference limit effective compression ratio corresponding to the engine speed Ne and the engine load Ce is extracted from the limit effective compression ratio map, and the correction amounts corresponding to the coolant temperature Tw, the intake air temperature Ti, the external air pressure Pa are extracted from the corresponding correction maps, respectively, and the reference limit effective compression ratio is corrected based on the correction amounts and, thereby, the limit effective compression ratio CR_max is estimated.

Next, the effective compression ratio CR is calculated based on the actual close timing IVC_r of the intake valve 11 read at Step S1 (Step S22). Specifically, the value corresponding to, for example, the engine speed Ne is extracted from the map of the effective compression ratio.

After the limit effective compression ratio CR_max is estimated and the effective compression ratio CR is calculated, the margin CR_mrg that is the difference between the limit effective compression ratio CR_max and the effective compression ratio CR is calculated (Step S23). Further, it is determined whether the margin CR_mrg is below the minimum margin CR_mrg0 (Step S24).

If the margin CR_mrg is determined to be above the minimum margin CR_mrg0 (Step S24: NO), as described later, after the pre-ignition stop control, it is determined whether the resuming control is necessary (Step S26), and if the resuming control is necessary, the resuming control is performed (Step S27). On the other hand, if the resuming control is not necessary, regular drive is maintained (Step S6).

Whereas, if the margin CR_mrg is determined to be below the minimum margin CR_mrg0 (the determination at Step S24: YES), a control of retarding the close timing IVC of the intake valve 11 from the basic intake valve close timing IVC0 to decrease the effective compression ratio (effective compression ratio decrease control) is performed (Step S25). In this embodiment, the storing module 41 is stored with a change amount of the close timing IVC of the intake valve 11 corresponding to the difference between the margin CR_mrg and the minimum margin CR_mrg0 in the form of map, the change amount corresponding to the difference is extracted from the map, and the close timing IVC of the intake valve 11 is retarded by the change amount.

Through performing the control from Steps S21 to S25 above (the pre-ignition margin maintaining control), even if the drive conditions change, the effective compression ratio of the engine body 1 is surely decreased from the limit effective compression ratio to a value smaller by more than a predetermined minimum margin CR_mrg0.

Whereas, if the occurrence of pre-ignition is confirmed (the determination as Step S5: YES), as the controller of stopping the pre-ignition, the pre-ignition stop control is executed (Step S7).

Next, the contents of the pre-ignition stop control at Step S7 are specifically explained with reference to FIG. 7. When the pre-ignition stop control starts, first, a control of determining whether the close timing of the intake valve 11 (IVC), which is currently set earlier than a close timing in a case where the close timing of the intake valve 11 (IVC) is retarded to the maximum at Step S11 described below (most retarded timing Tx), is executed (Step S10). Note that, the most retarded timing Tx, which is a determination threshold in this case, is set to a timing at which the blow back of the intake air occurs and the effective compression ratio of the engine is sufficiently decreased (e.g., about 110° CA after the intake BDC). If the close timing of the intake valve 11 is further retarded from the most retarded timing Tx, the effective compression ratio of the engine enormously decreases and the output of the engine becomes significantly insufficient. Therefore, as an amount with which the close timing can be retarded to the maximum, the most retarded timing Tx is set.

Within the particular engine driving range R, at first, the close timing of the intake valve 11 is set to, for example, around 30° CA after the intake BDC (ABDC) as a timing at which the blow back of the intake air does not occur. Therefore, the first determination at Step S10 naturally becomes NO, and the processing proceeds to the next Step S11 to start a control of retarding the close timing of the intake valve 11. Specifically, through driving the VVT 15 in a direction toward which the operation timing of the intake valve 11 is retarded, the close timing of the intake valve 11 is retarded from a currently set value by a predetermined amount, and the effective compression ratio of the engine is decreased. Thereby, the pressure at the end of compression stroke (internal cylinder pressure near the compression TDC) is mainly reduced to suppress the pre-ignition.

Here, the control of decreasing the effective compression ratio by retarding the close timing of the intake valve 11 as above is accompanied by some extent of response delay. That is, in order to decrease the compression ratio, the operation timing of the intake valve 11 is required to be changed gradually by a mechanical operation using the VVT 15 (variable valve timing mechanism), and the close timing is required to be retarded to a predetermined target timing according to the decreased amount of the effective compression ratio. Therefore, some time length is required to decrease the effective compression ratio by a desired amount through retarding the close timing of the intake valve 11 to the target timing.

Thus, at the next Step S12, a control of temporarily enriching the air-fuel ratio within the cylinder is executed to secure a suppressing effect of the pre-ignition until the decrease control of the effective compression ratio (the retarding of the close timing of the intake valve 11) is completed. Specifically, by increasing the injection amount of the fuel from the injector 18, the air-fuel ratio of the mixture gas inside the cylinder is set to a value richer than a current air-fuel ratio as well as a theoretical air-fuel ratio. When the air-fuel ratio becomes richer than the theoretical air-fuel ratio, the temperature inside the cylinder is decreased by the latent heat of the vaporization of the fuel, therefore, the heat receiving amount of the fuel reduces and the occurrence of pre-ignition is suppressed. Note that, because only elongating the opened period (injection time length of the fuel) of the injector 18 is required to enrich the air-fuel ratio, an instant reaction can be acquired without a particular response delay.

Within the particular engine driving range R, the air-fuel ratio within the cylinder is set to about the theoretical air-fuel ratio (14.7:1) in a regular state of the engine without the pre-ignition. Therefore, by enriching the air-fuel ratio at Step S12, an air excess ratio λ within the cylinder, that is a value obtained by dividing the air-fuel ratio (actual air-fuel ratio) of the mixture gas formed inside the combustion chamber 6 by the theoretical air-fuel ratio is decreased from "1" to a predetermined value below "1" (λ<1). For example, by the control at Step S12, the air excess ratio λ is decreased to about 0.75:1 (i.e., approximately 11:1 in air-fuel ratio).

After the air-fuel ratio is enriched as described above, a determination of whether the retarding of the close timing of the intake valve 11 is completed, that is whether the close timing of the intake 11 retarded by the actuation of the VVT 15 has reached the target timing is performed (Step S13). Note that, in the determination here, an operating angle of the VVT 15 may actually be detected and the determination may be based on the angle, or a determination of whether a required time length, obtained through, for example, an experiment in advance, has lapsed may be performed by using, for example, a timer.

After the determination at Step S13 is YES (the retarding of the IVC is completed), a control of cancelling the enrichment of the air-fuel ratio is executed (Step S14). That is, by reducing the fuel injection amount from the injector 18, the air-fuel ratio within the cylinder is changed back to about the theoretical air-fuel ratio. Thereby, the air excess ratio λ increases from the value after the enrichment (e.g., from 0.75:1) to λ=1.

Note that, with the multi-cylinder gasoline engine of a direct injection type such as the one in this embodiment, by controlling the fuel injection amount from the injector 18 for each cylinder separately, the air-fuel ratio of each cylinder 2 can be set for each cylinder 2 individually. Therefore, the enrichment of the air-fuel ratio and the cancel thereof (Steps S12 and S14) can be performed for each cylinder 2 independently, or simultaneously for all of the cylinders 2 (simultaneous control). Note that, the independent control per cylinder means, when the pre-ignition is detected in a certain cylinder, enriching the air-fuel ratio of the cylinder, whereas the simultaneous control means, when the pre-ignition is detected in one cylinder, similarly enriching the air-fuel ratios within the other cylinders as well (i.e., the air-fuel ratio is enriched for the other cylinders regardless of the pre-ignition).

For example, the required time length for retarding the close timing of the intake valve 11 to the target timing is assumed to be longer than one combustion cycle and shorter than two combustion cycles. If the air-fuel ratio is independently enriched for each cylinder 2 in such a case, due to the occurrence of pre-ignition in a certain cylinder, the air-fuel ratio within the cylinder, where the pre-ignition occurs (hereinafter, may be referred to as "the pre-ignition cylinder"), is enriched at the next combustion therein and the enrichment is cancelled at the second next combustion in the pre-ignition cylinder. On the other hand, if the air-fuel ratio is simultaneously enriched for all of the cylinders 2, due to the occurrence of pre-ignition in a certain cylinder, the air-fuel ratios are enriched in the order starting from a cylinder in which the combustion starts later than the pre-ignition cylinder. Further, the enrichment of each cylinder continues at least until the next combustion of the pre-ignition cylinder, and the enrichment is cancelled before the second next combustion of the pre-ignition. Here, because the effective compression ratio is decreased further toward the cylinder where the enrichment is performed later, an amount of enrichment may be set smaller as the enrichment proceeds to the next cylinder.

After the control at Step S14 (canceling the enrichment) is finished, "1", indicating that the control is under execution, is inputted to a flag F (the default value is "0") for storing the execution and non-execution of pre-ignition stop control (Step S15), and the processing returns to the main flow as shown in FIG. 6.

The above described control at Steps S10 to S15 (pre-ignition stop control) is repeated until the pre-ignition is avoided (i.e., until the determination at Step S5 in FIG. 6 becomes NO). Further, by repeating the control as above, the close timing of the intake valve 11 is retarded stepwise, and the effective compression ratio correspondingly is decreased stepwise.

For example, if an amount of retarding the close timing of the intake valve 11 once is set to 2° CA, through the execution of pre-ignition stop control, the close timing of the intake valve 11 is first retarded by 2° CA with respect to a current set value and, when the pre-ignition still cannot be avoided, is further retarded by 2° CA therefrom. Then, such a control of retarding by 2° CA each continues within a range where the close timing of the intake valve 11 does not reach the most retarded timing Tx (see the time charts in FIG. 9 described below). Conversely, if the pre-ignition is avoided before the most retarded timing Tx, the retarding control is stopped immediately.

That is, under the occurrence of pre-ignition, the close timing of the intake valve 11 is retarded at least once, and if the pre-ignition is not avoided thereby, through repeating the retarding process, the retarding amount is increased from the primary state stepwise. Further, every time the close timing of the intake valve 11 is retarded, the control of enriching the air-fuel ratio is executed in conjunction therewith, and thereby, the response delay of the retarding control is compensated each time. Note that the retarding of the close timing of the intake valve 11 and the enrichment of the air-fuel ratio described above is stopped once the pre-ignition is avoided before the close timing of the intake valve 11 reaches the most retarded timing Tx.

After the close timing of the intake valve 11 is retarded to the most retarded timing Tx at Step S11, if the pre-ignition still continues to occur, because the determination at Step 10 is NO, at the next Step S16, a predetermined warning for informing, for example, the driver that the engine is in an abnormal situation is issued. That is, the state in which the pre-ignition continues to occur even after the close timing of the intake valve 11 is retarded to the most retarded timing Tx (i.e., the effective compression ratio of the engine is decreased to the maximum) it may be considered that the engine is at an abnormally high temperature because of, for example, a failure of a cooling system of the engine, and therefore it is difficult for the vehicle to be further driven. Thus, the predetermined warning is issued to inform, for example, the driver that such a situation is caused. Note that the control of significantly decreasing the engine output may be executed together with the issuing of the warning.

Figure 9:
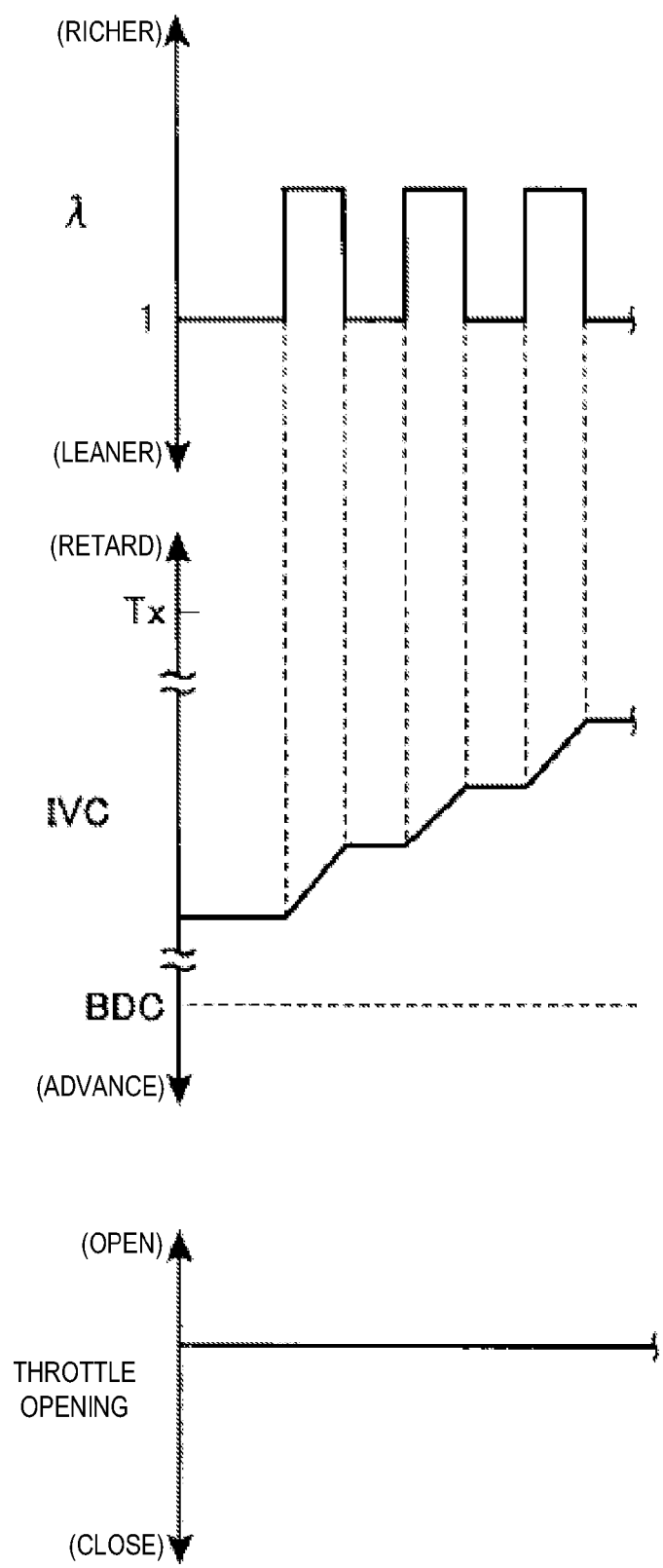
FIG. 9 is time charts showing an operation example of the pre-ignition stop control in a chronological order.

FIG. 9 is time charts showing how each of the air excess ratio (λ), the close timing of the intake valve 11 (IVC), and the opening of the throttle valve 22 (throttle opening) changes as the time lapses in a case where the pre-ignition is assumed not to be avoided unless the decrease control of the effective compression ratio is executed a plurality of times at the time of the pre-ignition stop control. As can be understood from FIG. 9, when the pre-ignition occurs, the close timing of the intake valve 11 (IVC) is retarded stepwise (e.g., 2° CA each), and the effective compression ratio of the engine is correspondingly decreased by each predetermined amount. Moreover, the control of temporarily enriching the air-fuel ratio is executed together with each retarding control of the IVC (decrease of the effective compression ratio). That is, only in the transient period from the start of retarding of the IVC until it reaches the target timing (an area where the IVC inclines rightward up), the air excess ratio λ is decreased from 1 to the predetermined value below "1." Thereby, the air-fuel ratio repeats changing between the rich state (λ<1) and about the theoretical air-fuel ratio (λ=1). Note that the enrichment of the air-fuel ratio is performed by increasing the fuel injection amount from the injector 18 while the amount of air (intake air amount Qa) to be introduced into the cylinder remains as it is. Therefore, the change of the throttle opening for the enrichment of the air-fuel ratio is not performed and is maintained at a constant opening as shown in FIG. 9.

Finally, a control operation in a case where the pre-ignition is avoided as a result of executing the pre-ignition stop control (FIGS. 7 and 9) is explained. Even in a case where the pre-ignition is avoided after the pre-ignition stop control, Steps S21 to S24 are first executed. Further, only when the determination at Step S24 is NO, that is the margin CR_mrg is below the minimum margin CR_mrg0, the resume control can be executed. If the determination at Step S24 is NO, a determination of whether it is after the pre-ignition stop control is performed. That is, after the pre-ignition stop control is executed, the flag F becomes F=1, thereafter, at Step S26, it is determined whether the flag F is "1." Further, if the flag F is "1", it is determined that it is after the pre-ignition stop control is executed, and the resume control is performed (Step S27).

In the resume control, contrary to the pre-ignition stop control shown in FIG. 9, by stepwise advancing the close timing of the intake valve 11 (IVC), the control of increasing the effective compression ratio by each predetermined amount is executed. Further, every time the IVC is advanced, the occurrence of pre-ignition and whether the pre-ignition margin is above the minimum margin are confirmed, and if there is no pre-ignition and the pre-ignition margin is above the minimum margin, the IVC is further advanced. Further, such stepwise advance of the IVC is continued until the close timing of the intake valve 11 reaches the regular timing, such as the basic intake valve close timing IVC0 (timing at which the blow back of the intake air hardly occurs). When the close timing IVC of the intake valve 11 reaches the regular timing or the effective compression ratio decrease control is executed at Step S25, the flag F is reset to "0." Note that, the air-fuel ratio during the resume control is maintained at either one of the theoretical air-fuel ratio and a value close thereto.

(4) Functions, Effects, etc.

As explained above, with the spark-ignition engine of this embodiment, the current limit effective compression ratio CR_max is estimated based on the engine speed Ne and engine load Ce, the fuel octane number, the intake air temperature, the coolant temperature, and the external air pressure, therefore, the estimation accuracy can be improved. Further, the current effective compression ratio CR is controlled to have a margin above the minimum margin CR_mar with respect to the limit effective compression ratio CR_max at all times. Therefore, even when an error is caused in estimating the limit effective compression ratio CR_max, the pre-ignition can further surely be avoided. Particularly, because the minimum margin CR_mrg is set constant without depending on the environmental conditions, even if the environmental conditions change, a predetermined margin is surely secured and the pre-ignition can surely be avoided.

Figure 10:
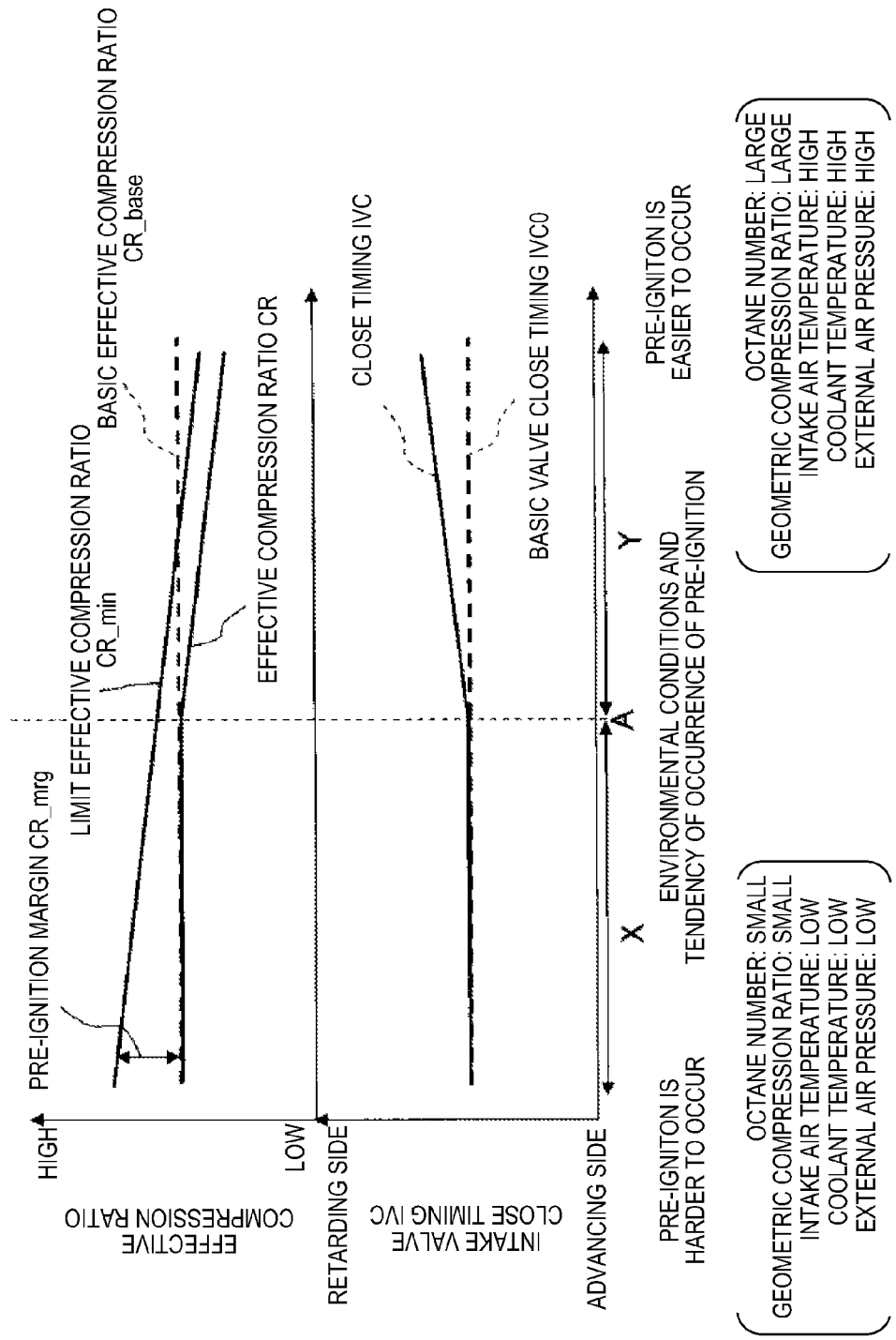
FIG. 10 is charts showing an example of a control result of a pre-ignition margin maintaining control.

The control result when the control of securing the margin of the effective compression ratio CR with respect to the limit effective compression ratio CR_max (pre-ignition margin maintaining control) is shown in FIG. 10. The upper chart in FIG. 10 shows changes of the limit effective compression ratio CR_max and the effective compression ratio CR according to the change in environmental conditions, at a predetermined engine speed Ne and engine load Ce. In the upper chart of FIG. 10 the reference numeral "CR_base" indicates the basic effective compression ratio when the close timing IVC of the intake valve 11 is the basic intake valve close timing IVC0. The lower chart in FIG. 10 shows the change of the close timing IVC of the intake valve 11 according to the change in the environmental conditions. In the lower chart of FIG. 10, the lateral axis schematically indicates the change of the environmental conditions. The pre-ignition occurs easier as the environmental conditions transits rightward in the lateral axis. In the example shown in FIG. 10, the octane number of the fuel, the geometric compression ratio, the intake air temperature, the coolant temperature, and the external air pressure are changed as the environmental conditions. The pre-ignition occurs easier as the octane number is reduced, the intake air temperature increases, the coolant temperature increases, and the external air pressure increases.

As shown in FIG. 10, under the conditions (range X) that lie to the leftward of environmental conditions A and under which the pre-ignition is harder to occur than under the environmental conditions A, the limit effective compression ratio CR_max is sufficiently higher than the basic effective compression ratio CR_base, and the margin CR of the basic effective compression ratio CR_base with respect to the limit effective compression ratio CR_max is above the reference margin CR_mrg0. Therefore, within the range X, the control of retarding the close timing IVC of the intake valve 11 is not executed so that the margin CR_mrg is suppressed to below the reference margin CR_mrg0, and the close timing IVC of the intake valve 11 is set to be the basic intake valve close timing IVC0.

On the other hand, under conditions (range Y) that lie rightward of the environmental conditions A and where the pre-ignition easily occurs, the limit effective compression ratio CR_max decreases and the margin CR of the basic effective compression ratio CR_base with respect to the limit effective compression ratio CR_max becomes below the reference margin CR_mrg0. Therefore, within the range Y, the control of retarding the close timing IVC of the intake valve 11 is executed to suppress the margin CR_mrg to below the reference margin CR_mrg0. Thereby, the close timing IVC of the intake valve 11 is retarded from the basic intake valve close timing IVC0. Thus, through the control above, the margin CR_mrg of the effective compression ratio CR with respect to the limit effective compression ratio CR_max is controlled to be above the reference margin CR_mrg0 (substantially in match with the reference margin CR_mrg0 in the illustration).

Further, with the spark-ignition engine of this embodiment, when the pre-ignition is detected based on the detection value of the ion current sensor 34 (detector), the control of retarding the close timing of the intake valve 11 to decrease the effective compression ratio by the predetermined amount is executed at least once, and the control of temporarily enriching the air-fuel ratio within the cylinder is executed in the transient period until the control is completed. According to such a configuration, an advantage that the pre-ignition can promptly and effectively be suppressed regardless of the respond delay of the control of decreasing the effective compression ratio can be obtained.

That is, in this embodiment, by decreasing the effective compression ratio and temporarily enriching the air-fuel ratio within the cylinder in the transient period until the effective compression ratio decrease control is completed as a measure when the pre-ignition is detected, even if a time period for the response delay is required from when the effective compression ratio starts to be decreased until the effective compression ratio is decreased by the predetermined amount, due to the cooling effect from enriching the air-fuel ratio (an effect that the latent heat of vaporization of more than the required amount of fuel decreases the temperature inside the cylinder) during the time period of the response delay, the pre-ignition can promptly be suppressed regardless of the response delay of the control above. Further, when the effective compression ratio actually decreases by the predetermined amount, and the pressure inside the cylinder at the end of the compression stroke (pressure near the compression TDC) is correspondingly reduced, in this state, by cancelling the enrichment of the air-fuel ratio, the enrichment of the air-fuel ratio is avoided for over a required time length and degradation of fuel consumption and emission ability can be suppressed to the minimum while securing the effect of suppressing the pre-ignition.

Further, specifically, in this embodiment, the air excess ratio λ is changed from "1" to the predetermined value below "1" (e.g., about 0.75) in the transient period until the control of decreasing the effective compression ratio is completed, and once the decrease of the effective compression ratio is completed, the air excess ratio λ is resumed to "1." According to such a configuration, the temperature inside the cylinder can appropriately be decreased under an environment where the air excess ratio λ is enriched to λ<1 in the transient period until the decrease of the effective compression ratio is completed, and the air excess ratio λ is resumed to λ=1 immediately after the decrease of the effective compression ratio is completed. Thereby, the combustion in the rich state of the air excess ratio λ can finish in a short time period.

Further, in this embodiment, as shown in, for example, FIG. 9, if the pre-ignition is detected even after the effective compression ratio is decreased by the predetermined amount, the control of further decreasing the effective compression ratio (control of further retarding the close timing of the intake valve 11) is executed, and in the transient period until the effective compression ratio decrease control is completed, the control of temporarily enriching the air-fuel ratio within the cylinder again is executed. According to such a configuration, even if the pre-ignition is not avoided by only decreasing the effective compression ratio once, by increasing the decreased amount of the effective compression ratio stepwise thereafter, the pre-ignition can surely be avoided. Further, because, by decreasing the effective compression ratio stepwise while confirming the occurrence of pre-ignition as described above, the decreased amount of the effective compression ratio is set to an appropriate amount that can avoid the pre-ignition, the engine output is not rapidly reduced regardless of the scale of pre-ignition, and the degradation of the drivability can be suppressed to a minimum. In addition, because the air-fuel ratio is temporarily enriched every time the effective compression ratio is decreased, the response delay in the control of decreasing the effective compression ratio can surely be compensated each time.

Moreover, in this embodiment, as the mechanism (variable mechanism) for decreasing the effective compression ratio of the engine, the VVT 15 (variable valve timing mechanism) for variably setting the operation timing of the intake valve 11 is used. Further, when the effective compression ratio is decreased, the close timing of the intake valve 11 is changed to the predetermined target timing corresponding to the decreased amount of the effective compression ratio, in the transient period until the effective compression ratio reaches the target timing, the air-fuel ratio is enriched. According to such a configuration, the effective compression ratio can be decreased with a further simple configuration unlike when, for example, a stroke amount of the piston 5 is changed to decrease the geometric compression ratio of the engine itself. Further, by enriching the air-fuel ratio during the response delay until the close timing of the intake valve 11 reaches the target timing, until the decrease of the effective compression ratio is actually completed, the enrichment of the air-fuel ratio is appropriately continued and the pre-ignition can be suppressed.

Further, in this embodiment, within the particular engine driving range R where the engine speed is low and the engine load is high in the warmed-up state of the engine, the pre-ignition is detected by the ion current sensor 34, and when the pre-ignition is detected to be in progress, the effective compression ratio is decreased and the air-fuel ratio is enriched. According to such a configuration, the temperature and pressure inside the cylinder easily increase, and further the occurrence of pre-ignition is appropriately checked under the drive conditions in which the actual time length (heat receiving time period) for which the fuel is exposed to such an environment is long, that is, under the drive conditions in which the pre-ignition most easily occurs, and the pre-ignition can be suppressed.

Further, in this embodiment, during the drive within the particular engine driving range R, the control (divided injections) of injecting the part of the fuel to be injected from the injector 18 on the compression stroke (especially after the intermediate stage) is executed. According to such a configuration, the cylinder is effectively cooled internally by the latent heat of the vaporization of the fuel injected on the compression stroke after the intermediate stage thereof. Therefore, the pre-ignition can be suppressed in advance under the drive conditions in which the pre-ignition most easily occurs.

Further, in this embodiment, during the drive within the particular engine driving range R, the timing of the spark-ignition by the ignition plug 16 is set to the timing delayed from the compression TDC. Therefore, knocking in addition to the pre-ignition can effectively be suppressed. That is, although within the particular engine driving range R where the pre-ignition easily occurs, naturally, knocking also easily occurs, by delaying the timing of the spark-ignition as described above to start the combustion from the retarding side of the compression TDC, the unburnt mixture gas (end gas) becomes difficult to self-ignite during the following combustion stroke, and knocking is suppressed.

Note that, in this embodiment, within the particular engine driving range R where the engine speed is low and the engine load is high, the part of the fuel to be injected by the injector 18 is injected on the compression stroke after the intermediate stage thereof; however, within a range of the particular engine driving range R where the pre-ignition particularly easily occurs, the fuel may entirely be injected on the compression stroke after the intermediate stage thereof.

Further, in this embodiment, in the pre-ignition stop control, when the control of decreasing the effective compression ratio (Step S23) is performed, the effective compression ratio is decreased by setting the regular close timing of the intake valve 11 to the timing on the retarding side of the intake BDC, with which the blow back of the intake air does not occur (e.g., around 30° CA after the intake BDC) to the further retarding side (i.e., to cause the blow back of the intake air); however, the method of decreasing the effective compression ratio is not limited to this, and the effective compression may be decreased by, for example, advancing the close timing of the intake valve 11 to the advancing side of the intake BDC. Note that, in this case, the operation timing of the intake valve 11 is required to be changed significantly, the control amount of the VVT 15 increases, and a problem in which the response delay of the control further degrades. Moreover, to avoid this degradation, setting the close timing of the intake valve 11 in the regular state of the engine to, for example, the timing that substantially matches with the intake BDC can be considered; however, in this way, the intake air inertia cannot sufficiently be utilized, and a reduction in the engine output is caused.

Based on the above situations, after all, when the close timing of the intake valve 11 in the regular state of the engine (no pre-ignition) is set to the retarding side of the intake BDC and the effective compression ratio is decreased, as described in this embodiment, retarding the close timing of the intake valve 11 with respect to the regular timing is more advantageous in that the effective compression ratio can efficiently be decreased as needed while sufficiently securing the engine output in the regular state of the engine.

Further, in this embodiment, as the detector for detecting the pre-ignition, the ion current sensor 34 built with a plug therein for detecting the ion current at the time of the flame generation by applying the bias voltage between the ignition plug 16 is used; however, the ion current sensor provided separately to the ignition plug 16 may be used as the detector.

Further, in this embodiment, the pre-ignition is detected based on the flame detection timing by the ion current sensor 34; however, for example, a vibration sensor (knock sensor) used, for example, to detect knocking is provided to the engine body 1, and the pre-ignition may be detected based on a detection value from the vibration sensor.

Obviously, knocking (a phenomenon in which the end gas self-ignites in a process where the flame propagates after the spark-ignition) and the pre-ignition (a phenomenon in which the mixture gas self-ignites before the normal combustion start timing by the spark-ignition) cannot be discriminated from each other only by simply checking a vibration strength from the vibration sensor, therefore, the pre-ignition is impossible to accurately detect. Therefore, to detect the pre-ignition by using the vibration sensor, for example, the ignition timing is purposely changed and the change of the detection value of the vibration sensor according to the ignition timing change may be checked. Thereby, knocking and pre-ignition can accurately be discriminated from each other to be detected.

For example, it is assumed that knocking occurs within the particular engine driving range R where the ignition timing is set to the retarding side of the compression TDC. In this case, the vibration sensor detects a high vibration strength; however, if the ignition timing is retarded with respect to the compression TDC, knocking is suppressed thereby, therefore, the vibration strength decreases corresponding to the retarding of the ignition timing. Whereas, when the pre-ignition is in progress, the mixture gas self-ignites regardless of the ignition timing, therefore, the pre-ignition is not suppressed by retarding the ignition timing, and the vibration strength does not decrease. Therefore, by using such a property to check the change of the vibration strength due to the retarding of the ignition timing, the pre-ignition can be detected by using the vibration sensor.

Further, in this embodiment, as the method of specifically calculating the current effective compression ratio CR by the effective compression ratio calculating module 48, the method using the actual close timing IVC_r of the intake valve 11 detected by the cam angle sensor 38 is used; however, instead of the detection value, a command value (the value corrected at, for example, Step S25 with respect to either one of the basic intake valve close timing IVC0 and the timing thereof IBC0) of the actual timing IVC of the intake valve 11 may be used.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

11 Intake Valve
15 VVT (Variable Valve Timing Mechanism)
18 Injector
34 Ion Current Sensor (Detector)
40 ECU
R Particular Engine Driving Range

The invention claimed is:

1. A method of controlling a spark-ignition engine including an ignition plug for spark-igniting a mixture gas inside a cylinder formed in an engine body, and an effective compression ratio changing module for changing an effective compression ratio of the engine body, the method comprising:
    estimating, based on an engine speed, an engine load, and environmental conditions under which the engine is driven, a limit effective compression ratio serving as a maximum effective compression ratio where a pre-ignition, in which the mixture gas self-ignites before a normal start timing of combustion due to a spark ignition, does not occur;
    calculating a current effective compression ratio;
    calculating a value obtained by subtracting the effective compression ratio from the limit effective compression ratio, as a margin before the pre-ignition occurs; and
    decreasing, when the margin is below a predetermined minimum margin, the effective compression ratio of the engine body by using the effective compression ratio changing module so that the margin is increased to be above the minimum margin, the minimum margin being set constant regardless of at least the environmental conditions.

2. The method of claim 1, wherein estimating the limit effective compression ratio includes estimating the limit effective compression ratio based on at least an octane number of fuel to be supplied into the cylinder, a temperature of intake air to be sucked into the cylinder, and a temperature of coolant for cooling the engine body.

3. The method of claim 1, wherein the effective compression ratio changing module is able to change a close timing of an intake valve provided to the engine body, and
    wherein decreasing the effective compression ratio includes decreasing the effective compression ratio of the engine body by changing the close timing of the intake valve.

4. The method of claim 1, wherein decreasing the effective compression ratio is performed within a particular engine driving range where the engine speed is low and the engine load is high in at least a warmed-up state of the engine.

5. The method of claim 2, wherein decreasing the effective compression ratio is performed within a particular engine driving range where the engine speed is low and the engine load is high in at least a warmed-up state of the engine.

6. The method of claim 4, wherein within the particular engine driving range, the mixture gas is spark-ignited by the ignition plug at a timing retarded from a top dead center on a compression stroke.

7. The method of claim 5, wherein within the particular engine driving range, the mixture gas is spark-ignited by the ignition plug at a timing retarded from a top dead center on a compression stroke.

8. The method of claim 6, further comprising using an injector for injecting the fuel into the cylinder, wherein within the particular engine driving range, a late stage injection in which the fuel is injected into the cylinder by the injector at a late stage timing set to during a time when the compression stroke is performed, and an early stage injection in which the fuel is injected into the cylinder by the injector at a timing set to be advanced from the late stage injection timing is performed.

9. The method of claim 7, further comprising using an injector for injecting the fuel into the cylinder, wherein within the particular engine driving range, a late stage injection in which the fuel is injected into the cylinder by the injector at a late stage timing set to during a time when the compression stroke is performed, and an early stage injection in which the fuel is injected into the cylinder by the injector at a timing set to be advanced from the late stage injection timing.

10. The method of claim 9, further comprising:

using a detector for detecting the pre-ignition;

decreasing, when the detector detects the pre-ignition, by the effective compression ratio changing module, the effective compression ratio of the engine body by a predetermined amount; and temporarily enriching an air-fuel ratio within the cylinder in a transient period from a start of decreasing the effective compression ratio by the predetermined amount, until the completion of the decrease of the effective compression ratio of the engine body, the air-fuel ratio being based on the fuel injected from the injector.

11. A spark-ignition engine, comprising:

an ignition plug for spark-igniting a mixture gas inside a cylinder formed in an engine body;

an effective compression ratio changing module for changing an effective compression ratio of the engine body; and a controller for controlling an operation of the effective compression ratio changing module, wherein the controller estimates, based on an engine speed, an engine load, and environmental conditions under which the engine is driven, a limit effective compression ratio serving as a maximum effective compression ratio where a pre-ignition in which the mixture gas self-ignites before a normal start timing of combustion due to a spark ignition does not occur, wherein the controller calculates a current effective compression ratio, wherein the controller calculates a difference value obtained by subtracting the effective compression ratio from the limit effective compression ratio, as a margin before the pre-ignition occurs, and wherein the controller operates, when the margin is below a predetermined minimum margin, the effective compression ratio changing module to decrease the effective compression ratio of the engine body so that the margin is increased to be above the minimum margin, the minimum margin being set constant regardless of at least the environmental conditions.

12. The spark-ignition engine of claim 11, wherein the controller estimates the limit effective compression ratio based on at least an octane number of fuel to be supplied into the cylinder, a temperature of intake air to be sucked into the cylinder, and a temperature of coolant for cooling the engine body.

13. The spark-ignition engine of claim 11, wherein the effective compression ratio changing module is able to change a close timing of an intake valve provided to the engine body, and wherein when the margin is below the predetermined minimum margin, the controller changes the close timing of the intake valve by the effective compression ratio changing module.

14. The spark-ignition engine of claim 11, wherein within a particular engine driving range where the engine speed is low and the engine load is high in at least a warmed-up state of the engine, the controller operates the effective compression ratio changing module to decrease the effective compression ratio of the engine body.

15. The spark-ignition engine of claim 12, wherein within a particular engine driving range where the engine speed is low and the engine load is high in at least a warmed-up state of the engine, the controller operates the effective compression ratio changing module to decrease the effective compression ratio of the engine body.

16. The spark-ignition engine of claim 14, wherein within the particular engine driving range, the controller spark-ignites the mixture gas by the ignition plug at a timing retarded from a top dead center on a compression stroke.

17. The spark-ignition engine of claim 15, wherein within the particular engine driving range, the controller spark-ignites the mixture gas by the ignition plug at a timing retarded from a top dead center on a compression stroke.

18. The spark-ignition engine of claim 16, further comprising an injector for injecting the fuel into the cylinder, wherein the controller is able to control an operation of the injector, and within the particular engine driving range, injects the fuel into the cylinder by the injector at a late stage timing set to during the compression stroke and injects the fuel into the cylinder by the injector at a timing set to be advanced from the late stage injection timing.

19. The spark-ignition engine of claim 17, further comprising an injector for injecting the fuel into the cylinder, wherein the controller is able to control an operation of the injector, and within the particular engine driving range, injects the fuel into the cylinder by the injector at a late stage timing set to during the compression stroke and injects the fuel into the cylinder by the injector at a timing set to be advanced from the late stage injection timing.

20. The spark-ignition engine of claim 19, further comprising a detector for detecting the pre-ignition, wherein when the detector detects the pre-ignition, the controller decreases, by the effective compression ratio changing module, the effective compression ratio of the engine body by a predetermined amount, and temporarily enriches an air-fuel ratio within the cylinder in a transient period from the start of the decrease of the effective compression ratio until the completion thereof, the air-fuel ratio being based on the fuel injected from the injector.

* * * * *